(12) United States Patent  (10) Patent No.: US 12,058,619 B2
You et al.  (45) Date of Patent: Aug. 6, 2024

(54) METHOD FOR PERFORMING PDCCH MONITORING BY TERMINAL IN WIRELESS COMMUNICATION SYSTEM, AND TERMINAL USING SAME METHOD

(71) Applicant: LG ELECTRONICS INC., Seoul (KR)

(72) Inventors: Hyangsun You, Seoul (KR); Daesung Hwang, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 17/291,429

(22) PCT Filed: Dec. 9, 2019

(86) PCT No.: PCT/KR2019/017302
§ 371 (c)(1),
(2) Date: May 5, 2021

(87) PCT Pub. No.: WO2020/122528
PCT Pub. Date: Jun. 18, 2020

(65) Prior Publication Data
US 2022/0007290 A1 Jan. 6, 2022

(30) Foreign Application Priority Data

Dec. 12, 2018 (KR) .......... 10-2018-0160205
Dec. 12, 2018 (KR) .......... 10-2018-0160227
Dec. 12, 2018 (KR) .......... 10-2018-0160243

(51) Int. Cl.
H04W 52/02 (2009.01)
H04W 72/0446 (2023.01)
H04W 72/23 (2023.01)
H04W 76/28 (2018.01)

(52) U.S. Cl.
CPC ... *H04W 52/0232* (2013.01); *H04W 52/0235* (2013.01); *H04W 72/0446* (2013.01); *H04W 72/23* (2023.01); *H04W 76/28* (2018.02)

(58) Field of Classification Search
None
See application file for complete search history.

(56) References Cited

U.S. PATENT DOCUMENTS 8,462,803 B2  6/2013  Susitaival et al.
9,232,555 B2  1/2016  Su
9,655,116 B2  5/2017  Kim et al.
(Continued)

FOREIGN PATENT DOCUMENTS

EP  2869643  5/2015
KR  1020150132176  11/2015

*Primary Examiner* — San Htun
(74) *Attorney, Agent, or Firm* — LEE, HONG, DEGERMAN, KANG & WAIMEY

(57) ABSTRACT

The present specification relates to a method for monitoring a physical downlink control channel (PDCCH) performed by a terminal in a wireless communication system, in which a discontinuous reception (DRX) inactivity timer is started and a PDCCH is monitored while the DRX inactivity timer is in operation, wherein the terminal performs a power saving operation on the basis of receiving a go to sleep signal (GTS) while the DRX inactivity timer is in operation.

8 Claims, 34 Drawing Sheets

(56) References Cited

U.S. PATENT DOCUMENTS

| | | | |
|---|---|---|---|
| 2010/0208660 A1* | 8/2010 | Ji ..................... | H04W 52/0225 |
| | | | 370/328 |
| 2012/0147803 A1* | 6/2012 | Cai ................... | H04W 52/0209 |
| | | | 370/311 |
| 2015/0003311 A1* | 1/2015 | Feuersaenger .... | H04W 52/0225 |
| | | | 370/311 |
| 2016/0295636 A1* | 10/2016 | Yang ................. | H04W 52/0264 |
| 2018/0220366 A1* | 8/2018 | Bergström ........... | H04W 76/28 |
| 2019/0313331 A1* | 10/2019 | Zhang ............... | H04W 52/0216 |
| 2022/0039009 A1* | 2/2022 | Iyer ...................... | H04L 5/0098 |

\* cited by examiner (a)

(b)

(a)

(b)

(a)

(b)

METHOD FOR PERFORMING PDCCH MONITORING BY TERMINAL IN WIRELESS COMMUNICATION SYSTEM, AND TERMINAL USING SAME METHOD

CROSS-REFERENCE TO RELATED APPLICATIONS

This application is the National Stage filing under 35 U.S.C. 371 of International Application No. PCT/KR2019/017302, filed on Dec. 9, 2019, which claims the benefit of earlier filing date and right of priority Korean Application Nos. 10-2018-0160205, filed on Dec. 12, 2018, 10-2018-0160227, filed on Dec. 12, 2018, and 10-2018-0160243, filed on Dec. 12, 2018, the contents of which are all hereby incorporated by reference herein in their entirety.

BACKGROUND OF THE DISCLOSURE

Field of the Disclosure

The present disclosure relates to wireless communication.

Related Art

As more communication devices require a larger communication capacity, there is a need for improved mobile broadband communication compared to the existing radio access technology (RAT). In addition, Massive Machine Type Communications (MTC), which provides various services anytime, anywhere by connecting multiple devices and objects, is one of the major issues to be considered in next-generation communications. In addition, a communication system design in consideration of a service/terminal sensitive to reliability and latency is being discussed. The introduction of a next-generation wireless access technology in consideration of the expanded mobile broadband communication, massive MTC, and URLLC (Ultra-Reliable and Low Latency Communication) is being discussed, and, for convenience, the technology is called new RAT or NR in this specification.

Currently, in LTE and NR, the DRX operation is used to reduce the power consumption of the terminal. However, in all DRX On Duration, the terminal does not perform data transmission and reception, and in the DRX On Duration in which data transmission and reception is not performed, the terminal unnecessarily wakes up to perform PDCCH monitoring. Accordingly, there is a need to solve the problem of wasting power because the terminal unnecessarily wakes up in the DRX On Duration in which data transmission/reception is expected not to be performed.

SUMMARY

In an aspect, a method for monitoring a physical downlink control channel (PDCCH) in a wireless communication system is provided. The method may be performed by a user equipment (UE) and comprise starting a discontinuous reception (DRX) inactivity timer, and monitoring the PDCCH while the DRX inactivity timer is running, the UE performs a power saving operation based on receiving a go to sleep signal (GTS) while the DRX inactivity timer is running.

According to the present specification, since power consumption-related configurations of the UE can be more dynamically adjusted, a problem in which the UE wakes up unnecessarily in the DRX on duration in which data transmission/reception is not performed to perform PDCCH monitoring is solved, effective PDCCH monitoring is possible.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

DESCRIPTION OF EXEMPLARY EMBODIMENTS

A forward slash (/) or comma used herein may mean "and/or". For example, since "A/B" means "A and/or B", it may mean "only A" or "only B" or "any one of A and B". In addition, technical features that are individually described in one drawing may be implemented individually or at the same time. In addition, parentheses used in the present specification may mean "for example". Specifically, when displayed as "control information (PDCCH)", "PDCCH" may be proposed as an example of "control information". In addition, even when indicated as "control information (i.e., PDCCH)", "PDCCH" may be proposed as an example of "control information".

In the following specification, "/" and "," should be interpreted as representing "and/or". For example, "A/B" may mean "A and/or B". Furthermore, "A, B" may mean "A and/or B". Furthermore, "AB/C" may mean "at least one of A, B and/or C". Furthermore, "A, B, C" may mean "at least one of A, B and/or C".

Furthermore, in the following specification, "or" should be interpreted as representing "and/or". For example, "A or B" may include "only A", "only B", and/or "both A and B". In other words, in the following specification, "or" should be interpreted as indicating "additionally or Or".

Figure 1:
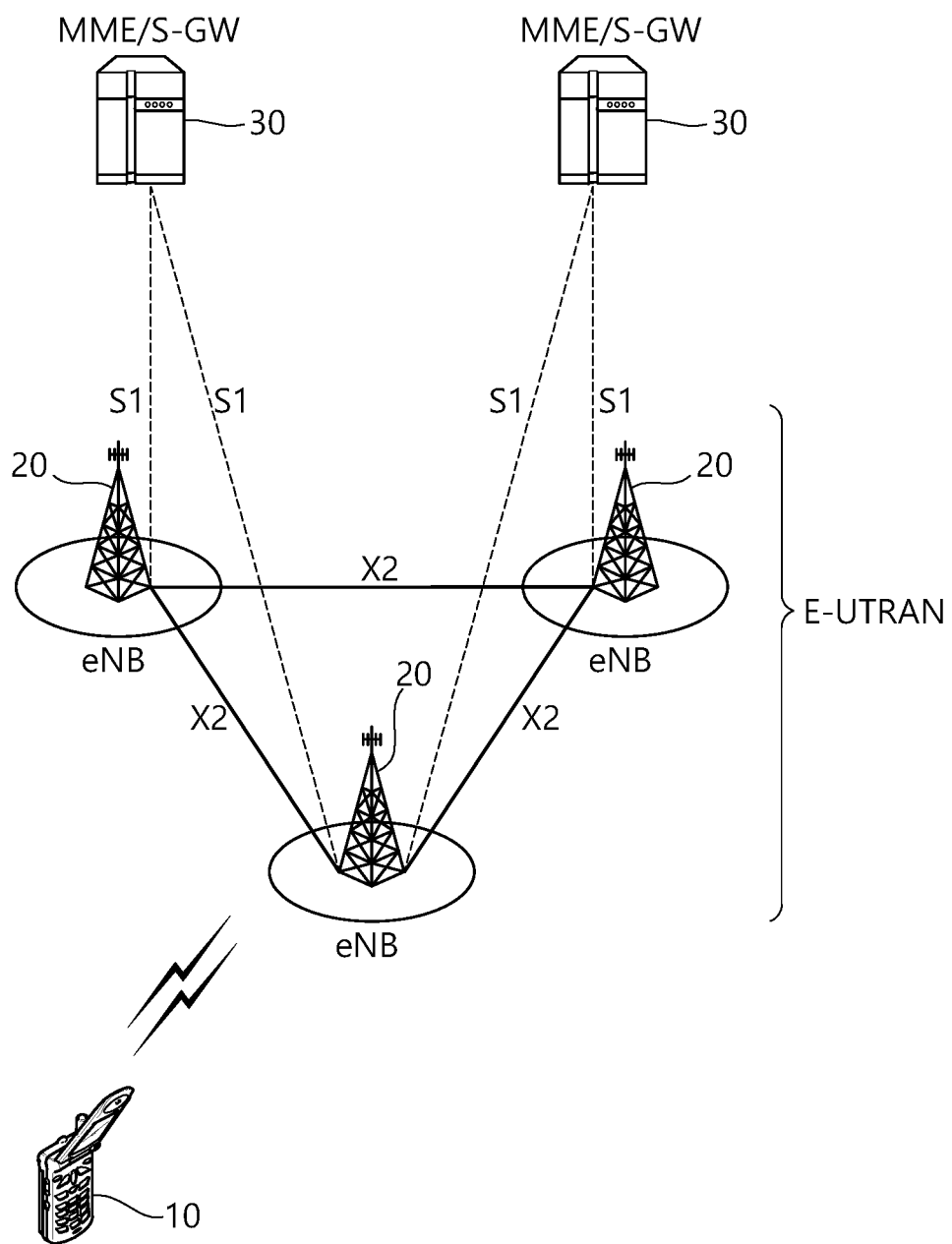
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
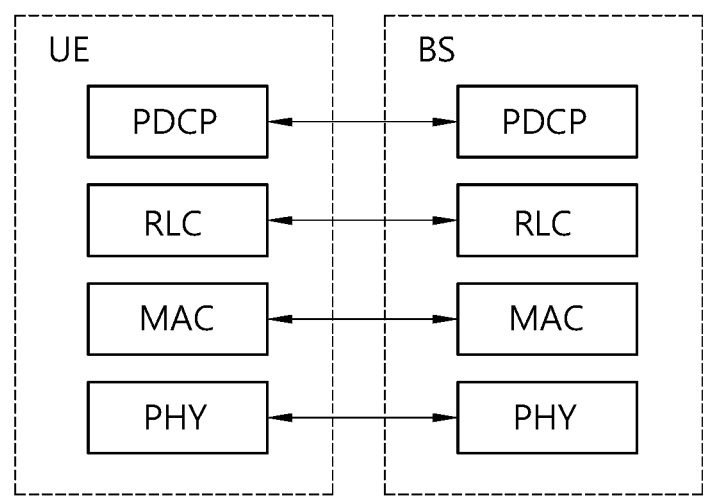
FIG. 2 is a diagram showing a wireless protocol architecture for a user plane.
Figure 3:
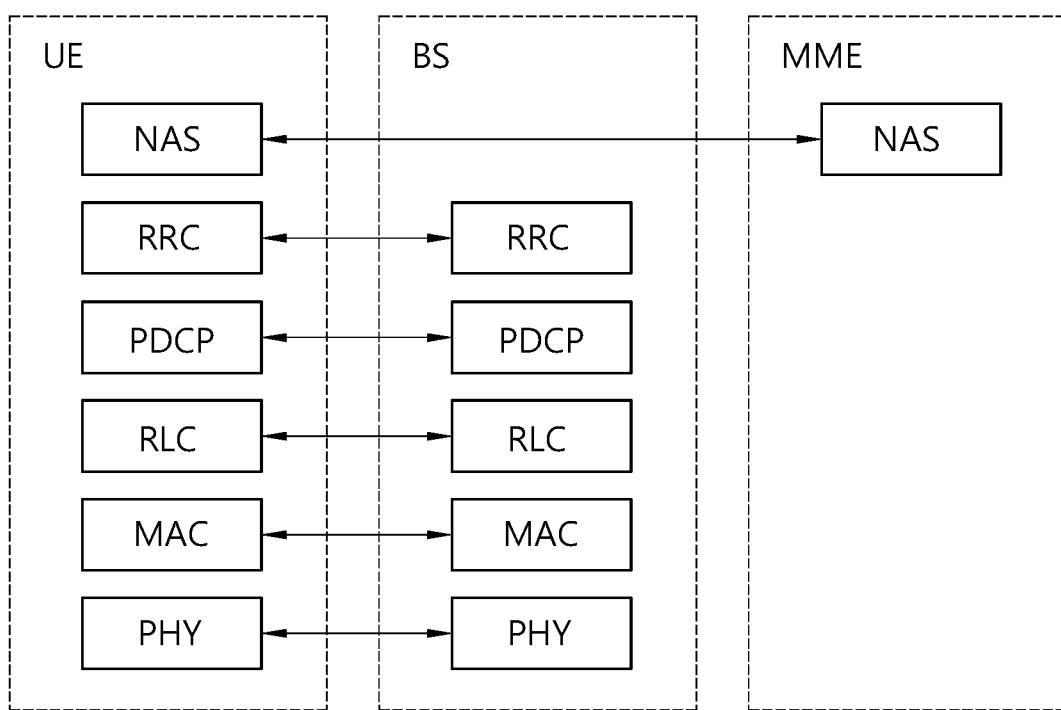
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more communication devices require a larger communication capacity, there is a need for improved mobile broadband communication compared to the existing radio access technology (RAT). In addition, Massive Machine Type Communications (MTC), which provides various services anytime, anywhere by connecting multiple devices and objects, is one of the major issues to be considered in next-generation communications. In addition, a communication system design in consideration of a service/terminal sensitive to reliability and latency is being discussed. The introduction of a next-generation wireless access technology in consideration of the expanded mobile broadband communication, massive MTC, and URLLC (Ultra-Reliable and Low Latency Communication) is being discussed, and, for convenience, the technology is called new RAT or NR in this specification.

Figure 4:
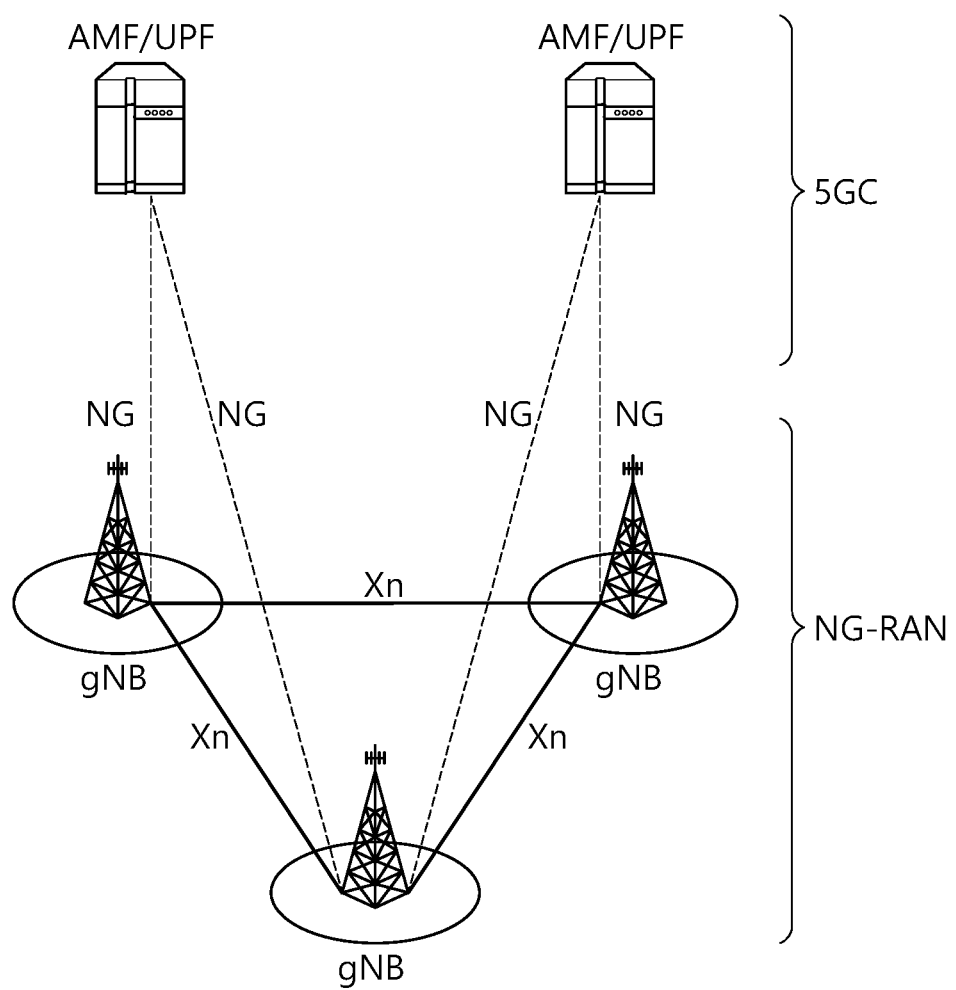
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
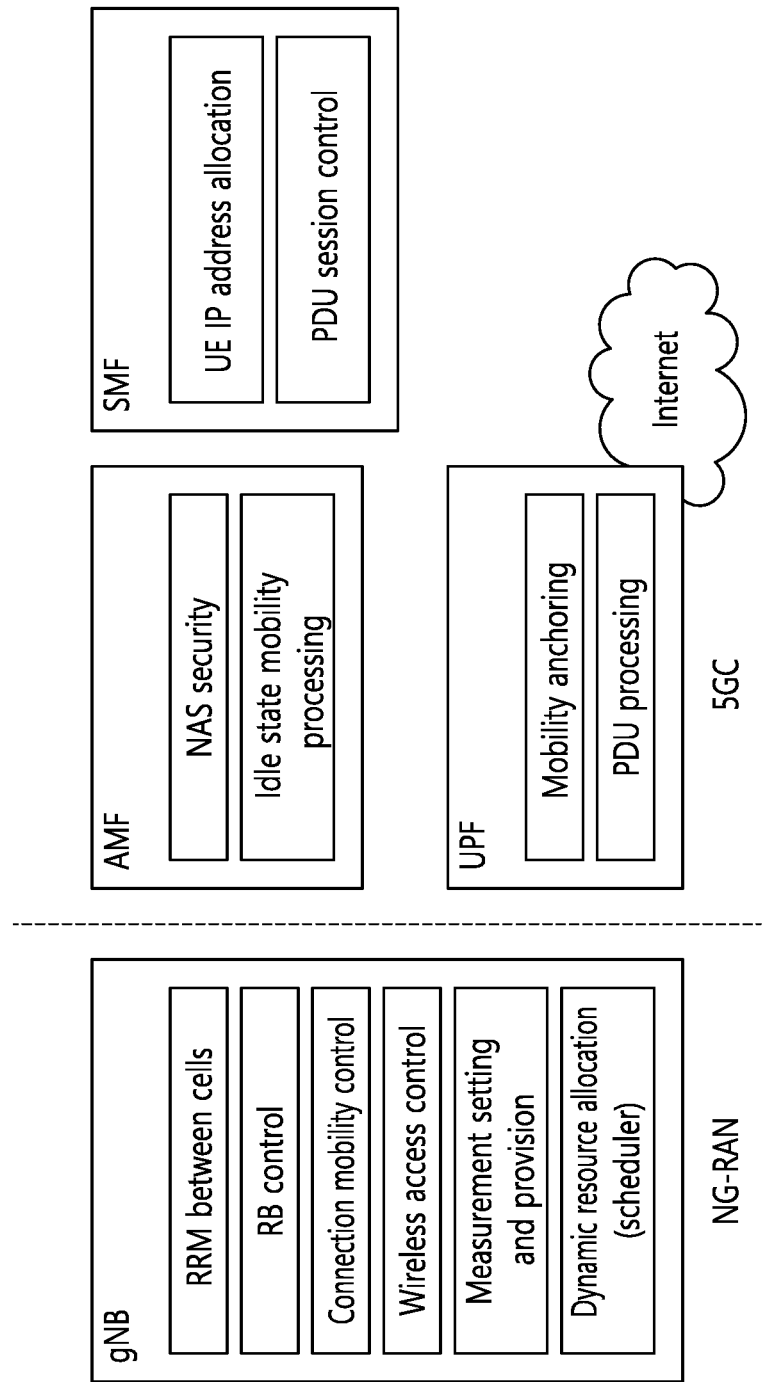
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
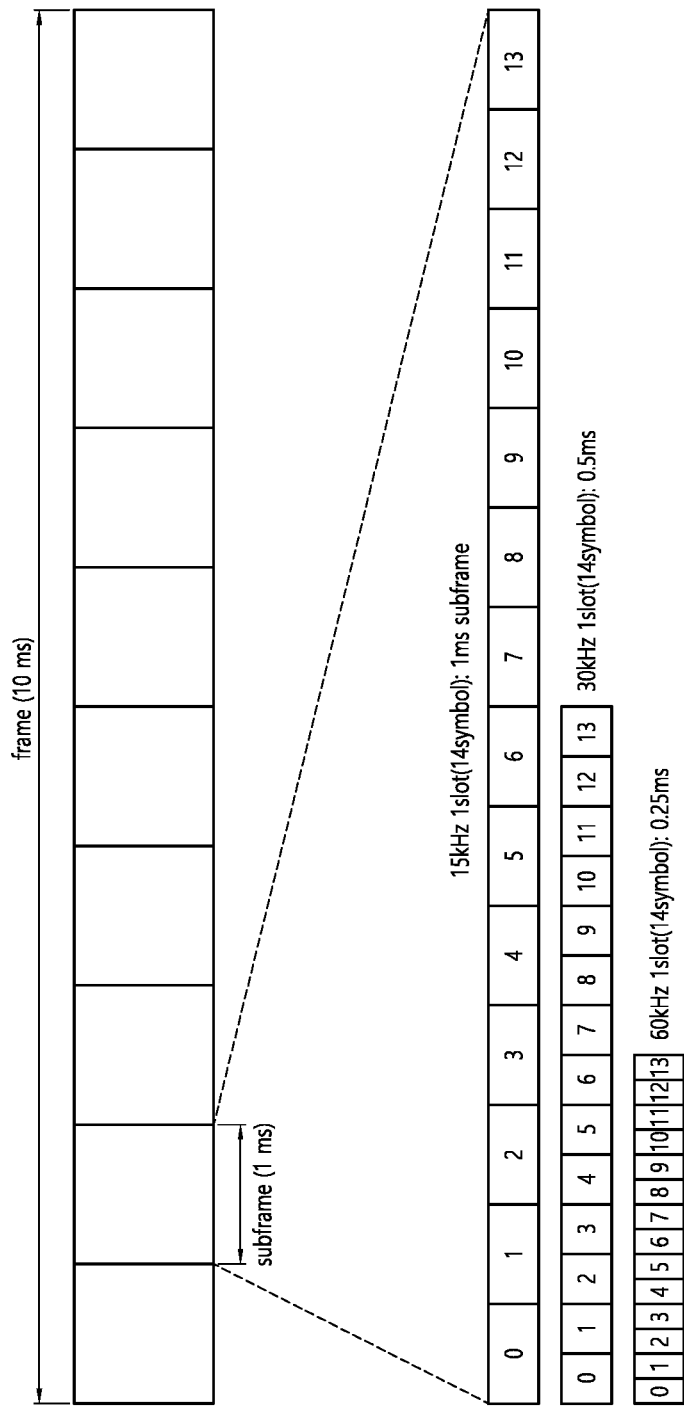
FIG. 6 illustrates a frame structure applicable in NR.

FIG. 6 illustrates a frame structure applicable in NR.

Referring to FIG. 6, a frame may consist of 10 milliseconds (ms) and may include 10 subframes of 1 ms.

A subframe may include one or a plurality of slots according to subcarrier spacing.

Table 1 below shows subcarrier spacing configuration µ.

TABLE 1

| µ | $\Delta f = 2^\mu \cdot 15$ [kHz] | CP(Cyclic Prefix) |
|---|---|---|
| 0 | 15 | Normal |
| 1 | 30 | Normal |
| 2 | 60 | Normal, Extended |
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), and the number of symbols in a slot ($N^{slot}_{symb}$) according to the subcarrier spacing configuration µ.

TABLE 2

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 6 shows µ=0, 1, and 2.

A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |

TABLE 3-continued

| Aggregation level | Number of CCEs |
|---|---|
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. Meanwhile, in the NR, a new unit called a control resource set (CORESET) may be introduced. A UE may receive the PDCCH in the CORESET.

Figure 7:
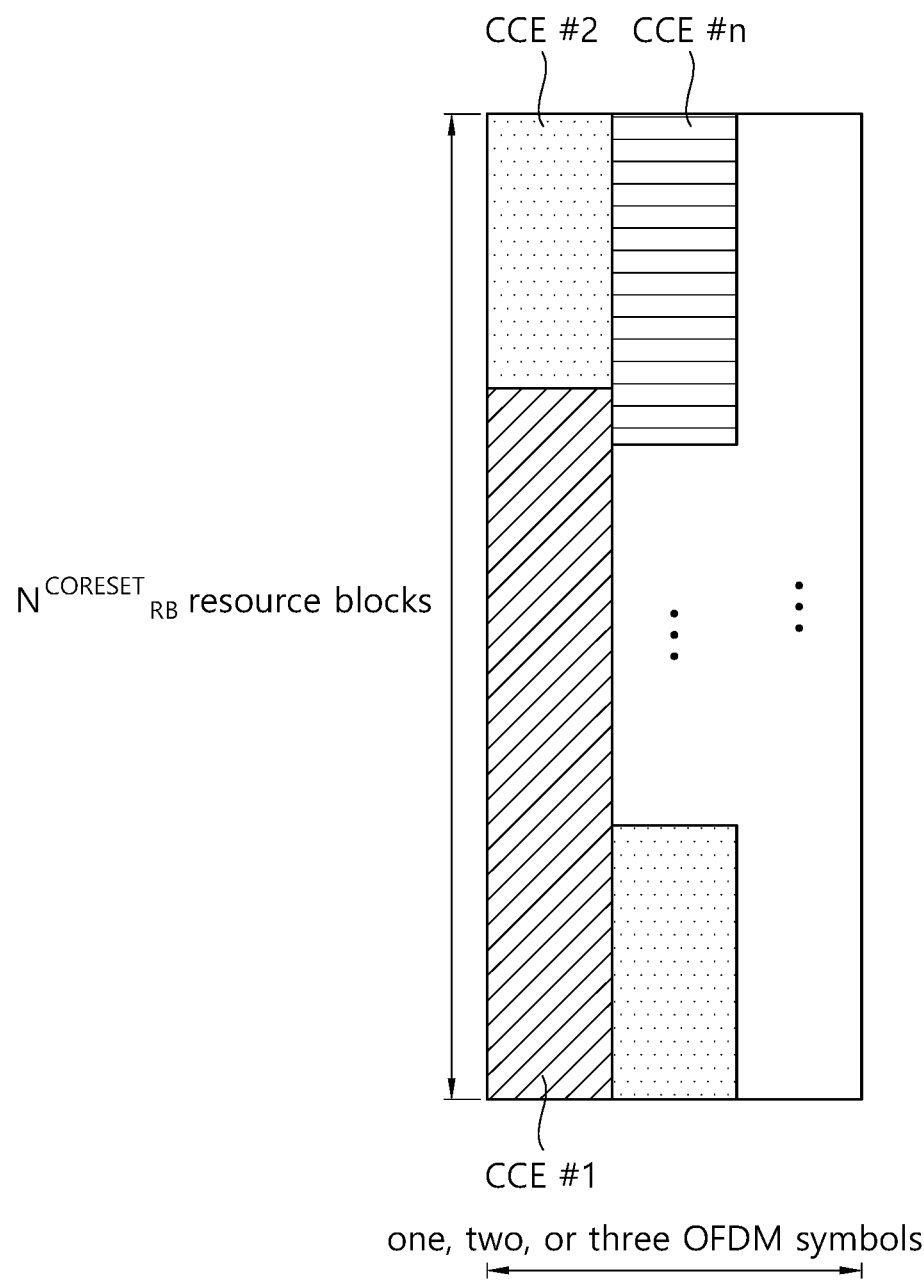
FIG. 7 illustrates a CORESET.

FIG. 7 illustrates a CORESET.

Referring to FIG. 7, the CORESET may include $N^{CORESET}_{RB}$ resource blocks in the frequency domain and $N^{CORESET}_{symb} \in \{1, 2, 3\}$ symbols in the time domain. $N^{CORESET}_{RB}$ and $N^{CORESET}_{symb}$ may be provided by a base station (BS) through higher layer signaling. As shown in FIG. 7, a plurality of CCEs (or REGs) may be included in the CORESET.

The UE may attempt to detect a PDCCH in units of 1, 2, 4, 8 or 16 CCEs in the CORESET. One or a plurality of CCEs for attempting PDCCH detection may be referred to as PDCCH candidates.

A plurality of CORESETs may be configured for the UE.

Figure 8:
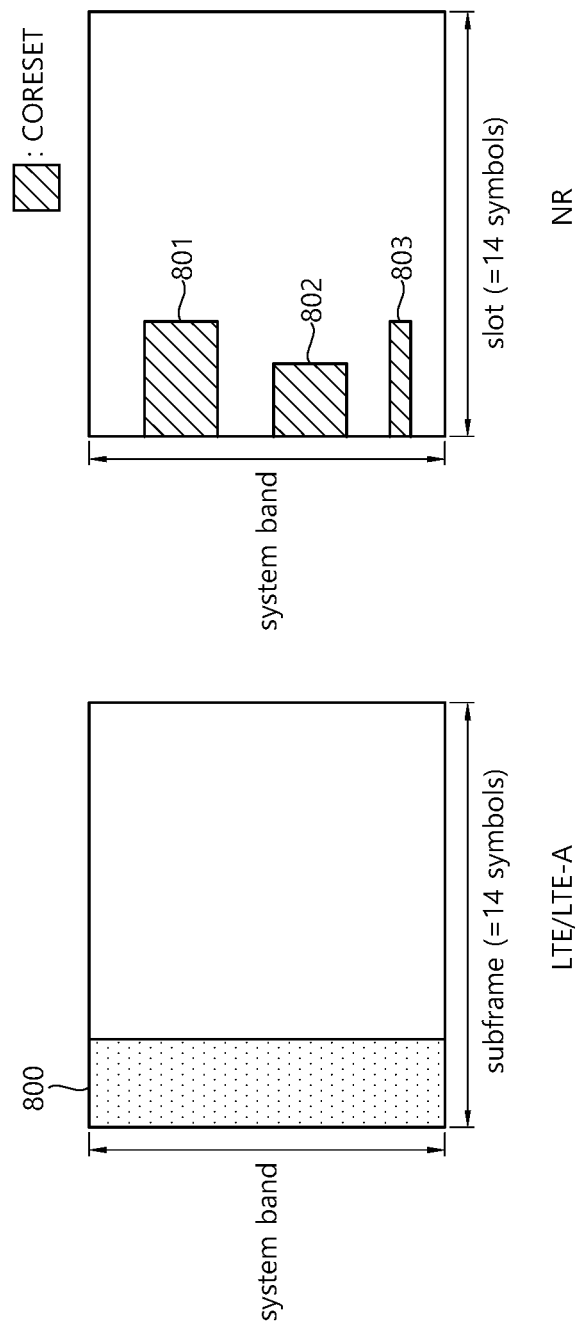
FIG. 8 illustrates a difference between a legacy control region and a CORESET in the NR.

FIG. 8 illustrates a difference between a legacy control region and a CORESET in the NR.

Referring to FIG. 8, a control region 800 in the legacy wireless communication system (e.g., LTE/LTE-A) is configured in the entire system band used by a BS. All terminals, excluding some UEs that support only a narrow band (e.g., eMTC/NB-IoT terminals), were supposed to be able to receive wireless signals of the entire system band of the BS in order to properly receive/decode control information transmitted from the BS.

Meanwhile, in the NR, the aforementioned CORESET was introduced. CORESETs 801, 802, and 803 may be radio resources for control information that the UE should receive and may use only a part of the system band, not the entire system band. The BS may allocate the CORESET to each terminal, and may transmit control information through the allocated CORESET. For example, in FIG. 8, a first CORESET 801 may be allocated to UE 1, a second CORESET 802 may be allocated to UE 2, and a third CORESET 803 may be allocated to UE 3. The UE in the NR may receive the control information from the BS even if the UE does not necessarily receive the entire system band.

The CORESET may include a UE-specific CORESET for transmitting UE-specific control information and a common CORESET for transmitting control information common to all UEs.

Meanwhile, in the NR, high reliability may be required depending on an application field, and in this context, a target block error rate (BLER) for a downlink control information (DCI) transmitted through a downlink control channel (e.g., physical downlink control channel (PDCCH)) may be significantly lower than that of the related art. As an example of a method for satisfying the requirement for such high reliability, the amount of contents included in the DCI may be reduced and/or the amount of resources used in DCI transmission may be increased. Here, the resource may include at least one of a resource in the time domain, a resource in the frequency domain, a resource in a code domain, and a resource in a spatial domain.

In NR, the following techniques/features may be applied.

<Self-Contained Subframe Structure>

Figure 9:
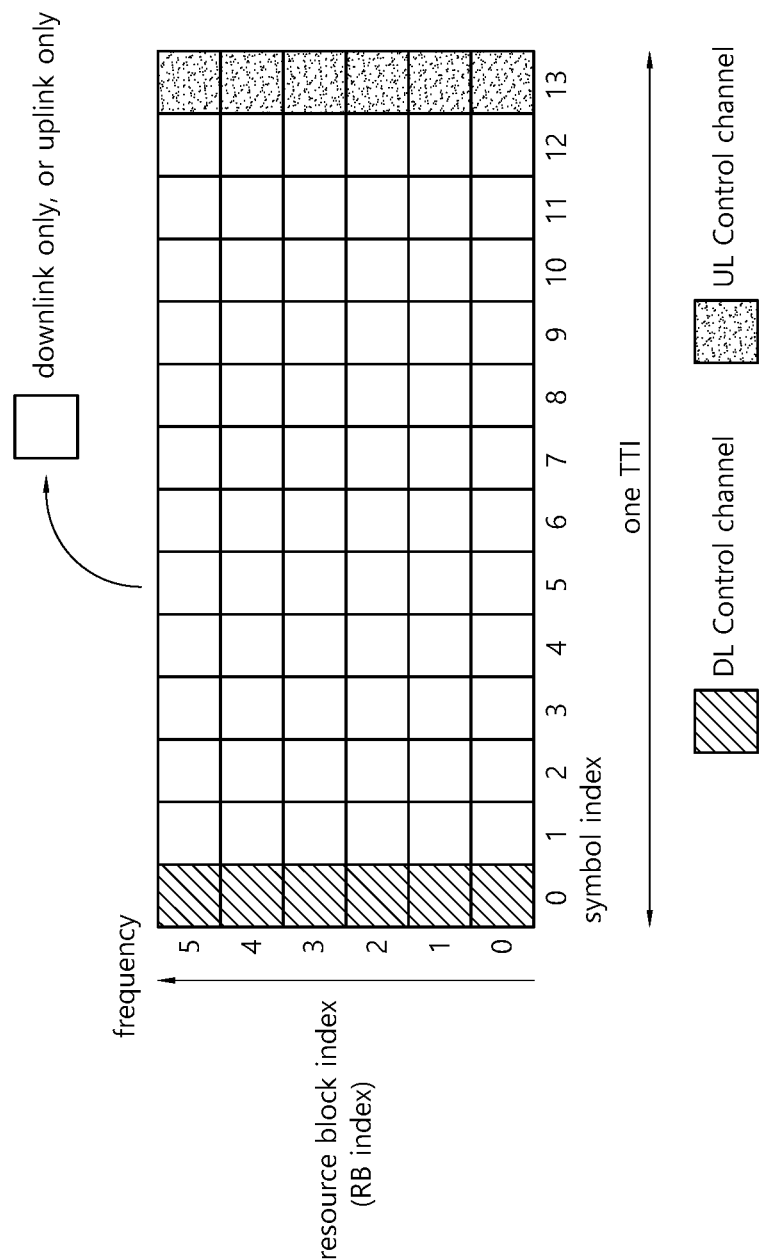
FIG. 9 shows an example of a frame structure for a new radio access technology.

FIG. 9 shows an example of a frame structure for a new radio access technology.

In NR, as shown in FIG. 9 for the purpose of minimizing latency, in one TTI, a structure in which a control channel and a data channel are time division multiplexed (TDM) may be considered as one of the frame structures.

In FIG. 9, a shaded area indicates a downlink control area, and a black area indicates an uplink control area. An area without indication may be used for downlink data (DL data) transmission or for uplink data (UL data) transmission. The characteristic of this structure is that downlink (DL) transmission and uplink (UL) transmission are sequentially performed in one subframe, then, DL data is transmitted and UL ACK/NACK (Acknowledgment/Not-acknowledgement) can also be received within a subframe, As a result, the time required to retransmit data when a data transmission error occurs is reduced, and thus, the latency of the final data transmission can be minimized.

In this data and control TDMed subframe structure, a time gap is required for a process of switching from a transmission mode to a reception mode or a process of switching from a reception mode to a transmission mode by the base station and the terminal. To this end, some OFDM symbols at a time point at which the DL to UL is switched in the self-contained subframe structure may be set as a guard period (GP).

<Analog Beamforming #1>

In the millimeter wave (mmW), the wavelength is shortened, making it possible to install multiple antenna elements in the same area. That is, in the 30 GHz band, the wavelength is 1 cm, and a total of 100 antenna elements can be installed in a two-dimensional arrangement at 0.5 wavelength intervals on a 5 by 5 cm panel. Therefore, in mmW, a plurality of antenna elements are used to increase beamforming (BF) gain to increase coverage or to increase throughput.

In this case, if a transceiver unit (TXRU) is provided to enable transmission power and phase adjustment for each antenna element, independent beamforming for each frequency resource is possible. However, to install TXRUs on all of the 100 antenna elements, there is a problem that the effectiveness is inferior in terms of price. Therefore, a method of mapping a plurality of antenna elements to one TXRU and adjusting the direction of a beam with an analog phase shifter is being considered. This analog beamforming method has a disadvantage in that it cannot perform frequency selective beamforming because only one beam direction can be created in the entire band.

It is possible to consider hybrid beamforming (hybrid BF) having B TXRUs, which is less than Q antenna elements, as an intermediate form between digital beamforming (digital BF) and analog beamforming (analog BF). In this case, although there is a difference according to the connection method of the B TXRUs and Q antenna elements, the directions of beams that can be simultaneously transmitted are limited to B or less.

<Analog Beamforming #2>

In an NR system, when multiple antennas are used, a hybrid beamforming technique combining digital beamforming and analog beamforming has emerged. At this time, analog beamforming (or RF beamforming) performs precoding (or combining) at the RF end, and thus this has the advantage that the number of RF chains and the number of D/A (or A/D) converters can be reduced, while the performance approaching digital beamforming can be achieved. For convenience, the hybrid beamforming structure may be represented by N TXRUs and M physical antennas. Then, digital beamforming for L data layers to be transmitted from the transmitter can be expressed as an N by L matrix, thereafter, the converted N digital signals are converted to analog signals through TXRU, and then analog beamforming expressed as an M by N matrix is applied.

Figure 10:
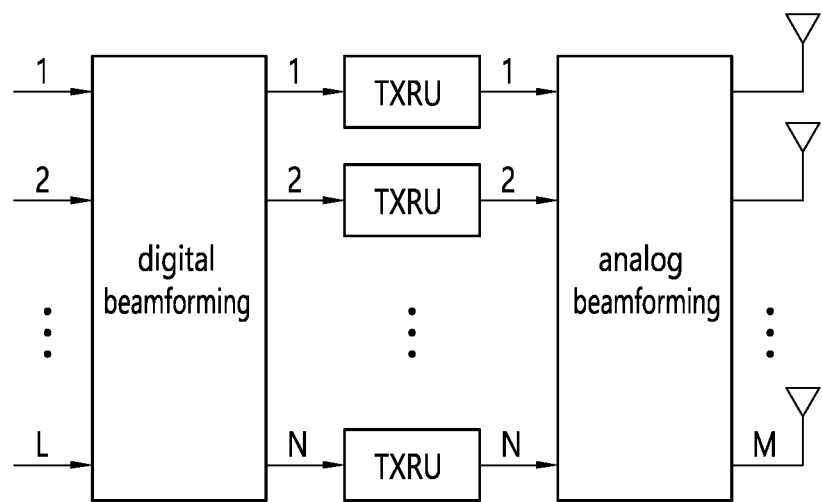
FIG. 10 is a schematic diagram of a hybrid beamforming structure from the viewpoint of the TXRU and the physical antenna.

FIG. 10 is a schematic diagram of a hybrid beamforming structure from the viewpoint of the TXRU and the physical antenna.

In FIG. 10, the number of digital beams is L, and the number of analog beams is N. Furthermore, in the NR system, the base station is designed to change analog beamforming in units of symbols, and a direction for supporting more efficient beamforming to a terminal located in a specific area is considered. Furthermore, when defining specific N TXRUs and M RF antennas in FIG. 10 as one antenna panel, in the NR system, a method of introducing a plurality of antenna panels to which independent hybrid beamforming can be applied is also considered.

Since the analog beam that is advantageous for signal reception for each terminal may be different when the base station uses a plurality of analog beams as described above, for at least a synchronization signal, system information, paging, etc., a beam sweeping operation that allows all terminals to have a reception opportunity by changing multiple analog beams to be applied by the base station for each symbol in a specific subframe is considered.

Figure 11:
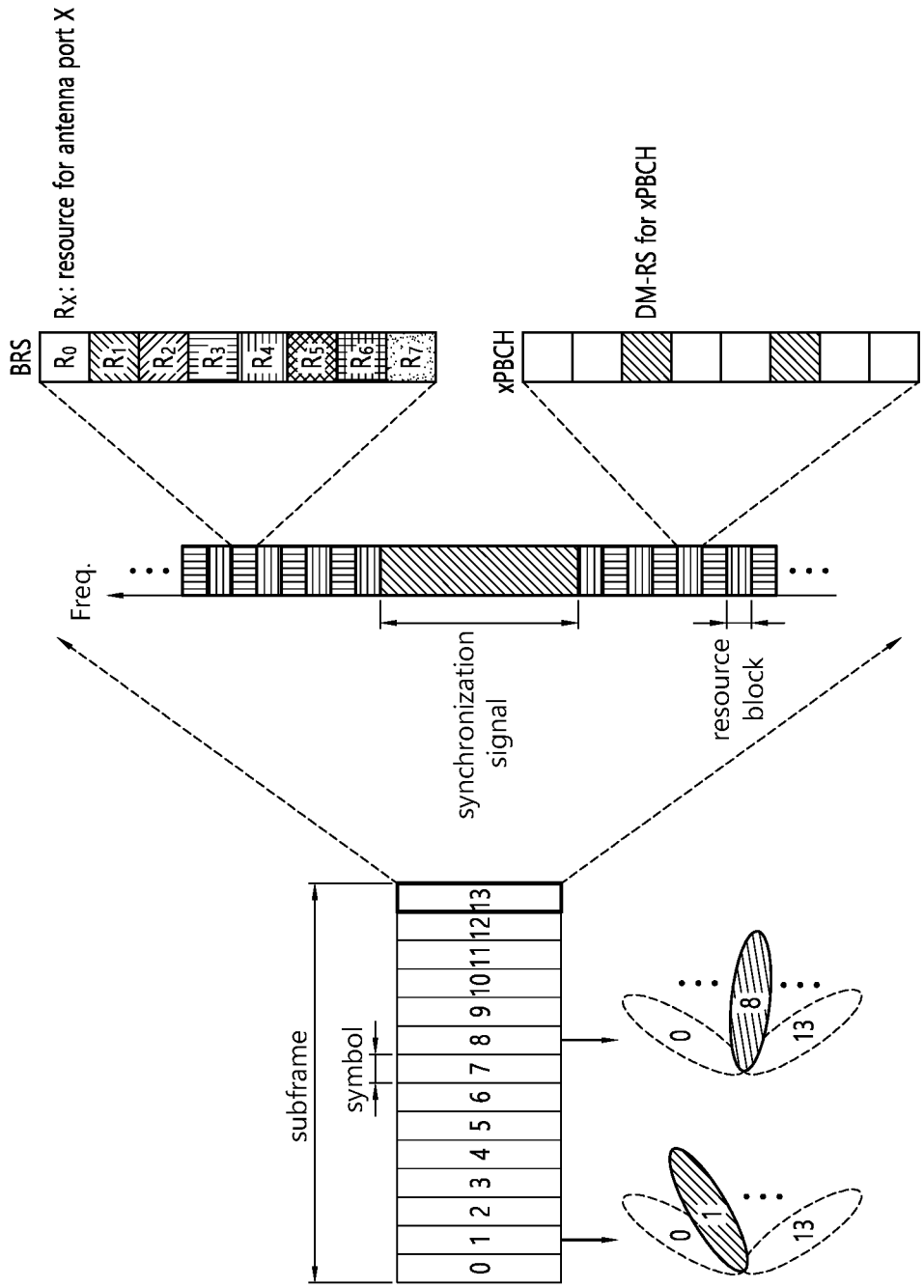
FIG. 11 is a schematic diagram of the beam sweeping operation for a synchronization signal and system information in a downlink (DL) transmission process.

FIG. 11 is a schematic diagram of the beam sweeping operation for a synchronization signal and system information in a downlink (DL) transmission process.

In FIG. 11, a physical resource (or a physical channel) through which system information of an NR system is transmitted through a broadcasting method is referred to as a physical broadcast channel (xPBCH). At this time, analog beams belonging to different antenna panels may be simultaneously transmitted within one symbol, in order to measure a channel for each analog beam, a method of introducing a beam reference signal (BRS), which is a reference signal (RS) transmitted by applying a single analog beam (corresponding to a specific antenna panel) as illustrated in FIG. 11, is being discussed. The BRS may be defined for a plurality of antenna ports, and each antenna port of the BRS may correspond to a single analog beam. In this case, unlike BRS, a synchronization signal or xPBCH may be transmitted by applying all analog beams in an analog beam group so that any terminal can receive it well.

Figure 12:
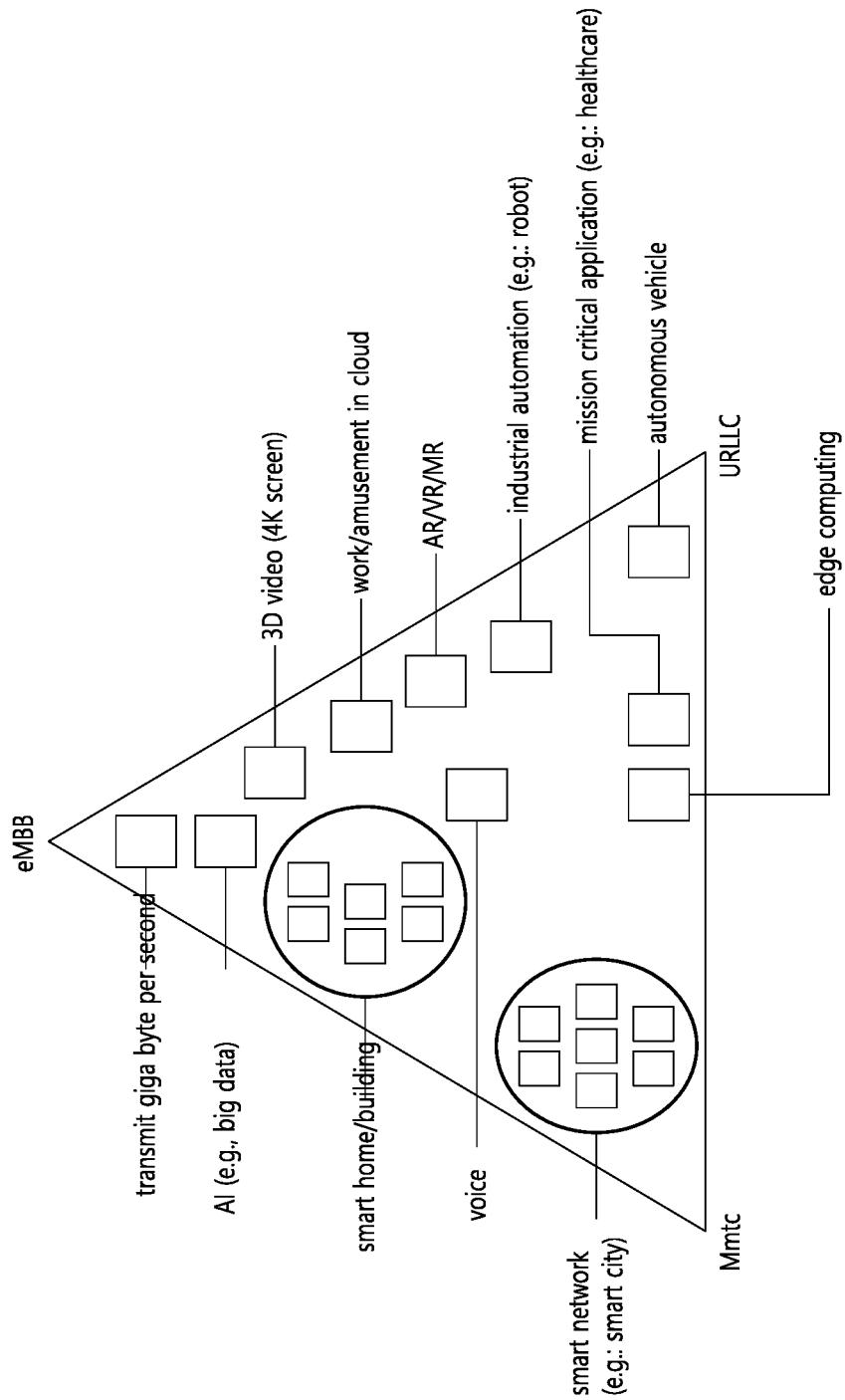
FIG. 12 shows an example of a 5G usage scenario to which the technical features of the present specification can be applied.

FIG. 12 shows examples of 5G usage scenarios to which the technical features of the present document can be applied. The 5G usage scenarios shown in FIG. 12 are only exemplary, and the technical features of the present document can be applied to other 5G usage scenarios which are not shown in FIG. 12.

Referring to FIG. 12, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 12 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Hereinafter, Discontinuous Reception (DRX) will be described.

Discontinuous reception (DRX) means an operation mode in which user equipment (UE) can discontinuously receive a downlink channel by reducing battery consumption. That is, a UE for which DRX is configured can reduce power consumption by discontinuously receiving a DL signal.

The DRX operation is performed within a DRX cycle representing a time interval at which On Duration is periodically repeated. The DRX cycle includes On Duration and Sleep Duration (or DRX occasion). On Duration represents a time interval in which a UE monitors a PDCCH in order to receive a PDCCH.

DRX can be performed in RRC (Radio Resource Control)_ IDLE state (or mode), RRC_INACTIVE state (or mode) or RRC_CONNECTED state (or mode). In RRC_IDLE state and RRC_INACTIVE state, DRX can be used to discontinuously receive a paging signal.

RRC_IDLE state: a state in which radio connection (RRC connection) between an eNB and a UE is not established.

RRC_INACTIVE state: a state in which radio connection (RRC connection) between an eNB and a UE is established but radio connection is deactivated.

RRC_CONNECTED state: a state in which radio connection (RRC connection) between an eNB and a UE is established.

DRX can be basically divided into idle mode DRX, connected DRX (C-DRX), and extended DRX.

DRX applied in an IDLE state may be referred to as idle mode DRX, and DRX applied in a CONNECTED state may be referred to as connected DRX (C-DRX).

eDRX (Extended/Enhanced DRX) is a mechanism for extending cycles of the idle mode DRX and C-DRX and may be mainly used for application of (massive) IoT. In idle mode DRX, whether to allow eDRX can be set on the basis of system information (e.g., SIB1). SIB1 may include an eDRX-allowed parameter. eDRX-allowed parameter indicates whether idle mode extended DRX is allowed.

Hereinafter, an idle mode DRX will be described.

In the idle mode, a UE can use DRX to reduce power consumption. One paging occasion (PO) is a subframe in which a P-RNTI (Paging-Radio Network Temporary Identifier) can be transmitted through a PDCCH (that addresses a paging message for NB-IoT), an MPDCCH (MTC PDCCH) or an NPDCCH (Narrowband PDCCH).

In the P-RNTI transmitted through the MPDCCH, the PO can represent the starting subframe of MPDCCH repetition. In case of the P-RNTI transmitted through the NPDCCH, when a subframe determined by the PO is not valid NB-IoT downlink subframe, the PO can represent the starting subframe of NPDCCH repetition. Accordingly, the first valid NB-IoT downlink subframe after the PO is the starting subframe of NPDCCH repetition.

One paging frame (PF) is one radio frame that can include one or more paging occasions. When DRX is used, a UE can monitor only one PO per DRX cycle. One paging narrow band (PNB) is a narrow band in which a UE performs paging message reception. PF, PO, and PNB can be determined on the basis of DRX parameters provided by system information.

Figure 13:
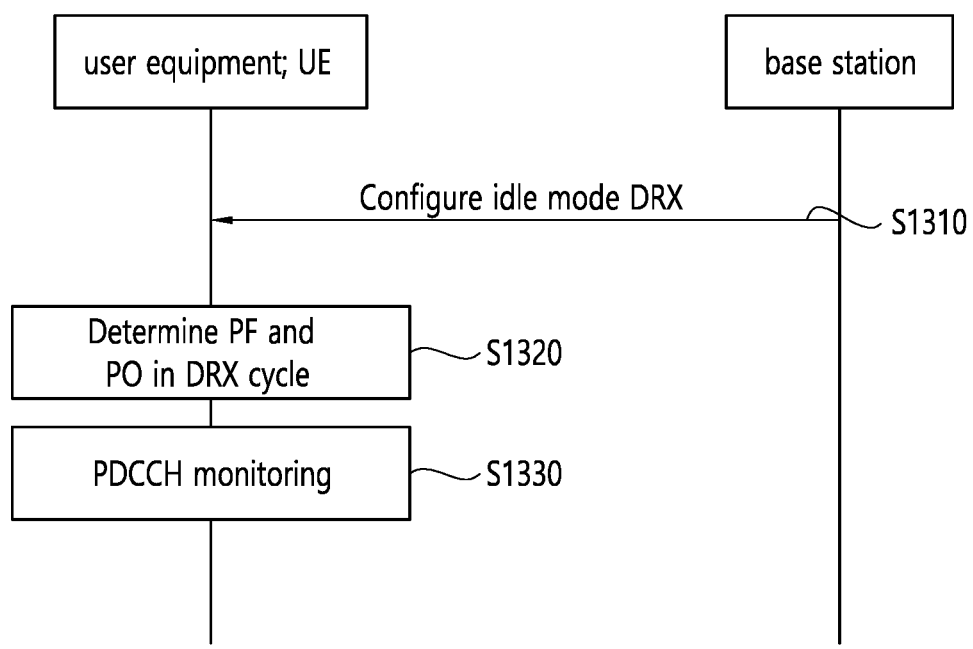
FIG. 13 is a flowchart illustrating an example of performing an idle mode DRX operation.

FIG. 13 is a flowchart illustrating an example of performing an idle mode DRX operation.

Referring to FIG. 13, a UE may receive idle mode DRX configuration information from a base station through higher layer signaling (e.g., system information) (S1310).

The UE may determine a paging frame (PF) and a paging occasion (PO) in order to monitor a PDCCH in a paging DRX cycle on the basis of the idle mode DRX configuration information (S1320). In this case, the DRX cycle may include On Duration and Sleep Duration (or DRX occasion).

The UE may monitor the PDCCH in the PO of the determined PF (S1330). Here, the UE monitors only one subframe (PO) per paging DRX cycle, for example. Further, upon reception of a PDCCH scrambled by a P-RNTI for On Duration (i.e., upon detection of paging), the UE can switch to a connected mode and transmit/receive data to/from the base station.

Figure 14:
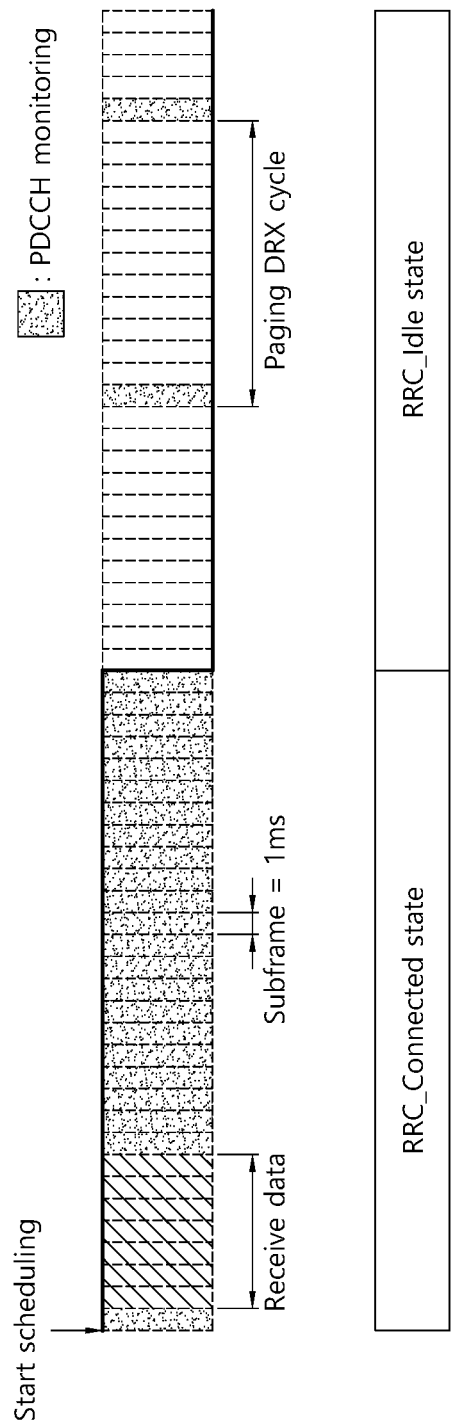
FIG. 14 schematically illustrates an example of the idle mode DRX operation.

FIG. 14 schematically illustrates an example of the idle mode DRX operation.

Referring to FIG. 14, when there is traffic directed to a UE in RRC_IDLE state (hereinafter referred to as a "idle state"), paging for the UE occurs. The UE can wake up periodically (i.e., at (paging) DRX cycle) to monitor a PDCCH. When paging is not present, the UE can switch to a connected state to receive data, and when data is not present, enter a sleep mode.

Hereinafter, a connected mode DRX (C-DRX) will be described.

C-DRX refers to DRX applied in RRC_CONNECTED state. The DRX cycle of C-DRX can be composed of a short DRX cycle and/or a long DRX cycle. Here, the short DRX cycle may be an option.

When C-DRX is configured, a UE can perform PDCCH monitoring for On Duration. When a PDCCH is successfully detected during PDCCH monitoring, the UE can operate (or execute) an inactive timer and remain in an awake state. On the other hand, when a PDCCH is not successfully detected during PDCCH monitoring, the UE can enter a sleep state after On Duration ends.

When C-DRX is configured, PDCCH reception occasions (e.g., slots having a PDCCH search space) may be discontinuously configured based on C-DRX configuration. On the contrary, when C-DRX is not configured, PDCCH reception occasions (e.g., slots having a PDCCH search space) can be continuously configured in the present disclosure.

Meanwhile, PDCCH monitoring may be limited to a time interval set to a measurement gap irrespective of C-DRX configuration.

Figure 15:
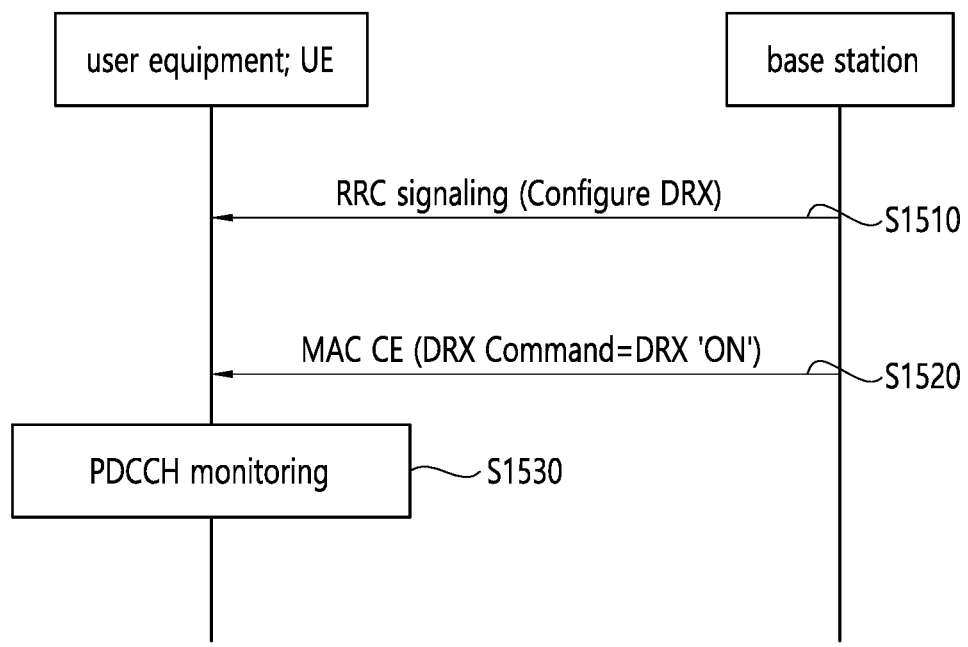
FIG. 15 is a flowchart illustrating an example of a method of performing a C-DRX operation.

FIG. 15 is a flowchart illustrating an example of a method of performing a C-DRX operation.

A UE may receive RRC signaling (e.g., MAC-MainConfig IE) including DRX configuration information from a base station (S1510).

Here, the DRX configuration information may include the following information.

onDurationTimer: the number of PDCCH subframes that can be continuously monitored at the start of a DRX cycle drx-InactivityTimer: the number of PDCCH subframes that can be continuously monitored when a UE decodes a PDCCH having scheduling information drx-RetransmissionTimer: the number of PDCCH subframes to be continuously monitored when HARQ retransmission is expected longDRX-Cycle: On Duration occurrence period drxStartOffset: a subframe number at which a DRX cycle starts drxShortCycleTimer: a short DRX cycle number shortDRX-Cycle: a DRX cycle operating by the number of drxShortCycleTimer when Drx-InactivityTimer expires In addition, when DRX "ON" is configured through a DRX command of a MAC command element (CE) (S1520), the UE monitors a PDCCH for On Duration of the DRX cycle on the basis of DRX configuration (S1530).

Figure 16:
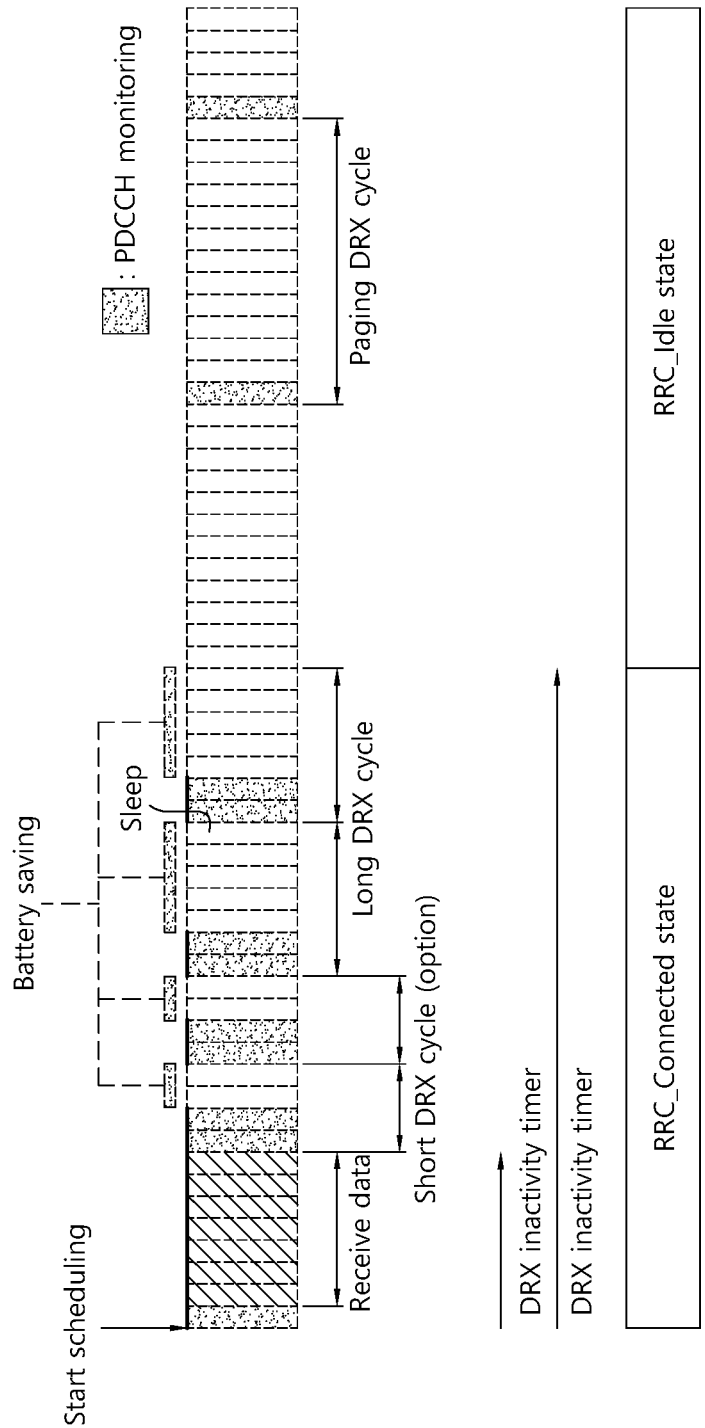
FIG. 16 schematically illustrates an example of the C-DRX operation.

FIG. 16 schematically illustrates an example of the C-DRX operation.

When a UE receives scheduling information (e.g., a DL grant) in RRC_CONNECTED state (hereinafter referred to as a connected state), the UE can execute an inactive timer and an RRC inactive timer.

When the DRX inactive timer expires, a DRX mode can be initiated. The UE can wake up in the DRX cycle and monitor a PDCCH for a predetermined time (on a duration timer).

In this case, when short DRX is configured, the UE initiates the DRX mode with a short DRX cycle first, and after the short DRX cycle ends, initiates the DRX mode with a long DRX cycle. Here, the long DRX cycle may correspond to a multiple of the short DRX cycle. In addition, the UE can wake up more frequently in the short cycle. After the RRC inactive timer expires, the UE can switch to an IDLE state and perform an idle mode DRX operation.

Hereinafter, a discussion related to power saving will be described.

The terminal's battery life is a factor of the user experience that influences the adoption of 5G handsets and/or services. Power efficiency for 5G NR terminals is not worse than at least LTE, and a study of terminal power consumption may be provided in order to identify and apply techniques and designs for improvement.

ITU-R defines energy efficiency as one of the minimum technical performance requirements of IMT-2020. According to the ITU-R report, the minimum requirements related to technical performance for the IMT-2020 air interface, "The energy efficiency of a device can be related to support for two aspects: a) Efficient data transmission in the case of load, b) Low energy consumption when there is no data. Efficient data transmission in the loaded case is demonstrated by average spectral efficiency. In the absence of data, the low energy consumption can be estimated by the sleep ratio."

Since the NR system can support high-speed data transmission, it is expected that user data tends to burst and serve for a very short period of time. One efficient terminal power saving mechanism is to trigger the terminal for network access from the power efficiency mode. Unless there is information about network access through the terminal power saving framework, the terminal maintains a power efficiency mode such as a micro-sleep or OFF period within a long DRX cycle. Instead, when there is no traffic to transmit, the network may support the terminal to switch from the network access mode to the power saving mode (e.g., dynamic terminal switching to sleep with a network support signal).

In addition to minimizing power consumption with a new wake-up/go-to-sleep mechanism, it may also be provided to reduce power consumption during network access in RRC_CONNECTED mode. More than half of the power consumption in LTE is the terminal in the connected mode. The power saving technique should focus on minimizing the main factors of the processing of the aggregated bandwidth, the number of dynamic RF chains, and power consumption during network access including dynamic transmit/receive time and dynamic transition to power efficiency mode. In most cases of LTE field TTI, since there is no or little data, a power saving scheme for dynamic adaptation to other data arrivals should be studied in the RRC-CONNECTED mode. Dynamic adaptation to traffic of various dimensions such as carrier, antenna, beamforming and bandwidth can also be studied. Further, it is necessary to consider how to enhance the switching between the network connection mode and the power saving mode. Both network-assisted and terminal-assisted approaches should be considered for terminal power saving mechanisms.

The terminal also consumes a lot of power for RRM measurement. In particular, the terminal must turn on the power before the DRX ON period for tracking the channel to prepare for RRM measurement. Some of the RRM measurement is not essential, but consumes a lot of terminal power. For example, low mobility terminals do not need to be measured as frequently as high mobility terminals. The network may provide signaling to reduce power consumption for RRM measurement, which is unnecessary for the terminal. Additional terminal support, for example terminal state information, etc., is also useful for enabling the network to reduce terminal power consumption for RRM measurement.

Accordingly, there is a need for research to identify the feasibility and advantages of a technology that enable implementation of a terminal capable of operating while reducing power consumption.

Hereinafter, UE power saving schemes will be described.

For example, the terminal power saving techniques may take into account a power saving signal/channel/procedure, and power consumption reduction in RRM measurement for terminal adaptation to traffic and power consumption characteristics, adaptation to frequency change, adaptation to time changes, adaptation to the antenna, adaptation to DRX configurations, adaptation to terminal processing capabilities, adaptation to obtain PDCCH monitoring/decoding reduction, terminal power consumption adaptation.

Regarding adaptation to the discontinuous reception (DRX) configuration, a downlink shared channel (DL-SCH) featuring support for terminal discontinuous reception to enable terminal power saving, and a paging channel (PCH) featuring support for terminal DRX enabling terminal power saving (Here, the DRX cycle may be indicated to the terminal by the network) may be considered.

Regarding adaptation to the terminal processing capability, the following techniques may be considered. When requested by the network, the terminal reports its terminal radio access capability, which is at least static. The gNB may request the ability of the UE to report based on band information. If allowed by the network, a temporary capability limit request may be sent by the terminal to signal the limited availability of some capabilities (e.g., due to hardware sharing, interference or overheating) to the gNB. Thereafter, the gNB can confirm or reject the request. Temporary capability limitations must be transparent to 5GC. That is, only static functions are stored in 5GC.

Regarding adaptation to obtain PDCCH monitoring/decoding reduction, the following techniques may be considered. The UE monitors the PDCCH candidate set at a configured monitoring occasion in one or more configured CORESETs according to a corresponding search space configuration. CORESET consists of a set of PRBs having a time interval of 1 to 3 OFDM symbols. Resource units REG and CCE are defined in CORESET, and each CCE is composed of a set of REGs. The control channel is formed by a set of CCEs. Different code rates for the control channel are implemented by aggregating different numbers of CCEs. Interleaved and non-interleaved CCE-REG mapping is supported in CORESET.

Regarding the power saving signal/channel/procedure for triggering terminal power consumption adaptation, the following technique may be considered. In order to enable reasonable terminal battery consumption when carrier aggregation (CA) is configured, an activation/deactivation mechanism of cells is supported. When one cell is deactivated, the UE does not need to receive a corresponding PDCCH or PDSCH, cannot perform a corresponding uplink transmission, and does not need to perform a channel quality indicator (CQI) measurement. Conversely, when one cell is activated, the UE must receive the PDCH and PDCCH (if the UE is configured to monitor the PDCCH from this SCell), and is expected to be able to perform CQI measurement. The NG-RAN prevents the SCell of the secondary PUCCH group (a group of the SCell on which PUCCH signaling is associated with PUCCH of PUCCH SCell) from being activated while the PUCCH SCell (Secondary cell configured of PUCCH) is deactivated. The NG-RAN causes the SCell mapped to the PUCCH SCell to be deactivated before the PUCCH SCell is changed or removed.

When resetting without mobility control information, the SCell added to the set of serving cells is initially deactivated, and the SCells remaining in the set of serving cells (unchanged or reconfigured) do not change the activation state (active or inactive).

SCells are deactivated when reconfiguring with mobility control information (e.g., handover).

To enable reasonable battery consumption when BA (bandwidth adaptation) is configured, for each uplink carrier, only one uplink BWP and one downlink BWP or only one downlink/uplink BWP pair can be activated at a time in an active serving cell, all other BWPs configured in the terminal are deactivated. In deactivated BWPs, the UE does not monitor the PDCCH and does not transmit on the PUCCH, PRACH and UL-SCH.

For BA, the BA does not need to be as wide as the cell's bandwidth and can be adjusted for the reception and transmission bandwidth of the terminal. The width can be commanded to change (e.g. shrink during periods of low activity to save power), and the position can be moved in the frequency domain (e.g. to increase scheduling flexibility), the subcarrier spacing can be ordered to be changed (e.g., to allow different services). A subset of the total cell bandwidth of a cell is referred to as a bandwidth part (BWP), the BA is obtained by configuring the BWP(s) to the terminal and notifying the terminal that the BWP is currently active among the configured BWPs. When the BA is configured, the UE only needs to monitor the PDCCH on one active BWP. That is, there is no need to monitor the PDCCH on the entire downlink frequency of the cell. The BWP inactive timer (independent of the DRX inactive timer described above) is used to convert the active BWP to the default BWP. The timer is restarted when the PDCCH decoding succeeds, and when the timer expires, switching to the default BWP occurs.

Figure 17:
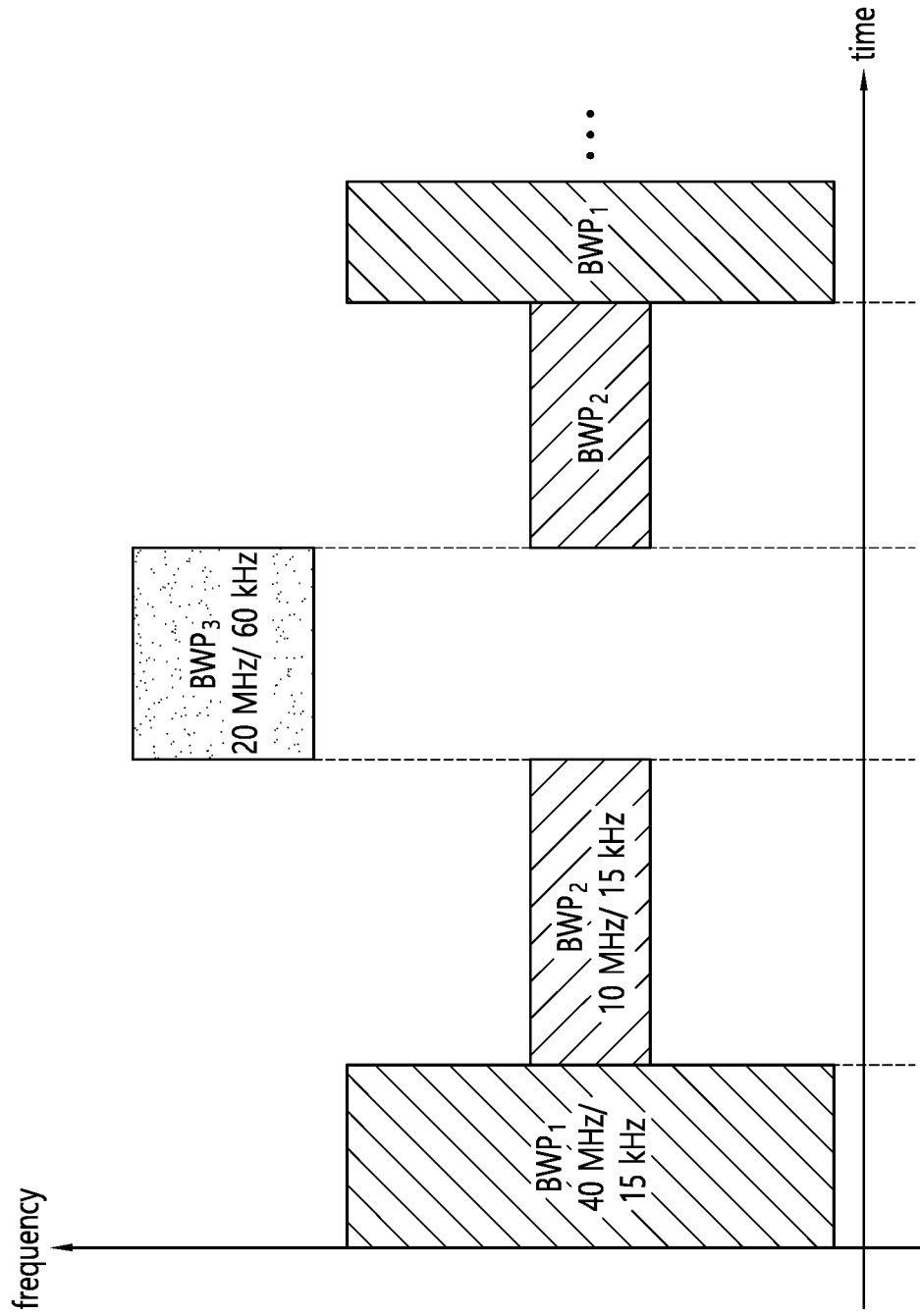
FIG. 17 illustrates a scenario in which three different bandwidth parts are configured.

FIG. 17 illustrates a scenario in which three different bandwidth parts are configured.

FIG. 17 shows an example in which BWP1, BWP2, and BWP3 are configured on time-frequency resources. BWP1 may have a width of 40 MHz and a subcarrier spacing of 15 kHz, BWP2 may have a width of 10 MHz and a subcarrier spacing of 15 kHz, and BWP3 may have a width of 20 MHz and a subcarrier spacing of 60 kHz. In other words, each of the bandwidth parts may have different widths and/or different subcarrier spacings.

Regarding the power consumption reduction in RRM measurement, the following technique may be considered. When two measurement types are possible, the RRM configuration may include (for layer 3 mobility) beam measurement information related to SSB(s) and CSI-RS(s) for the reported cell(s). In addition, when CA is configured, RRM configuration may include a list of best cells on each frequency for which measurement information is available. In addition, the RRM measurement information may include beam measurement for listed cells belonging to the target gNB.

Hereinafter, the proposal of the present specification will be described in more detail.

As described above, a DRX operation may be used to reduce power consumption of a terminal (hereinafter, the terminal may be used interchangeably with terms such as terminal and user equipment (UE)).

However, since the UE does not transmit and receive data in all DRX on duration, there may be a problem in that the UE unnecessarily wakes up and performs PDCCH monitoring in the DRX on duration in which data transmission/reception is not performed.

In addition, if data is scheduled in the DRX ON section and the inactivity timer operates, but data transmission and reception are terminated quickly, there may be a problem of performing PDCCH monitoring by maintaining the DRX ON state for a longer time than necessary.

In order to solve the above problem, a method of indicating that the UE terminates the DRX ON operation and can sleep may be considered. Accordingly, in the present specification, an operation when the UE receives information instructing to sleep is proposed.

In the existing C-DRX operation, the UE may wake up for a predetermined time period expressed as On Duration for each C-DRX cycle to perform data transmission/reception. Within this On Duration period, the UE may perform PDCCH monitoring at every PDCCH monitoring occasion for data transmission and reception.

When the UE receives the PDCCH during the On Duration, (the DRX inactivity timer (drx-InactivityTimer) starts, and) the DRX inactivity timer (drx-InactivityTimer) can operate, the period in which the DRX inactivity timer (drx-InactivityTimer) operates (the period in which the value of the DRX inactivity timer (drx-InactivityTimer) is greater than 0) may be referred to as the DRX inactivity time.

Here, the UE maintains the DRX ON state during the DRX inactivity time period, and may switch to the sleep state when the DRX inactivity time period ends. This operation will be described with reference to the drawings as follows.

Figure 18:
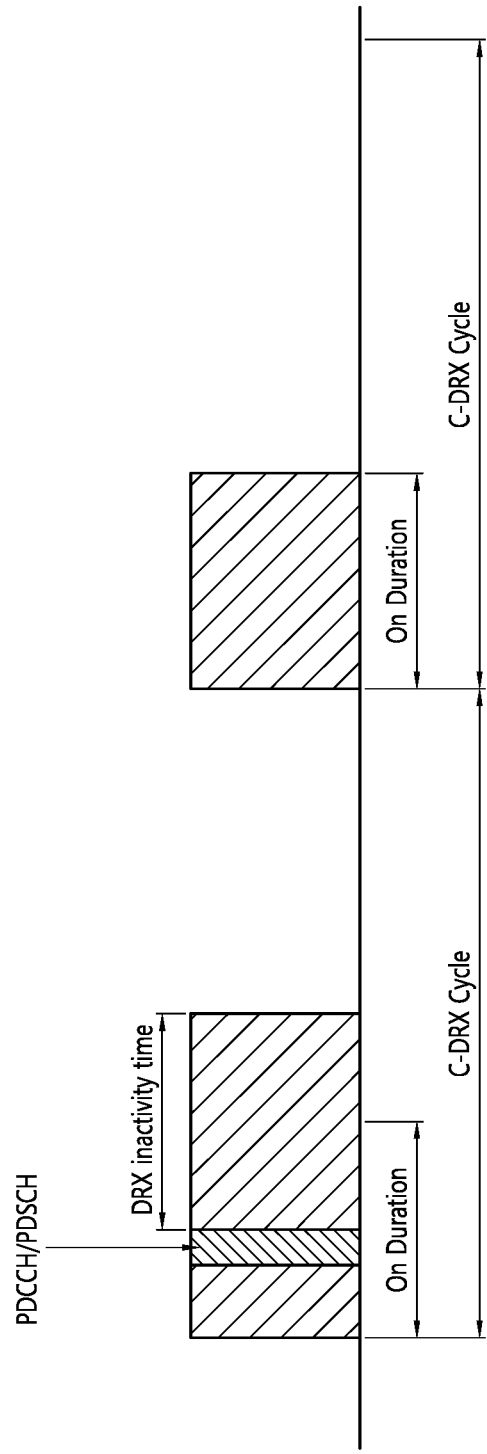
FIG. 18 schematically shows an example of a DRX operation.

FIG. 18 schematically shows an example of a DRX operation.

According to the first On Duration period of FIG. 18, as described above, the UE continues the DRX ON state during the DRX inactivity time period, and may switch to the sleep state when the DRX inactivity time period ends.

On the other hand, as in the second On Duration of FIG. 18, if the UE does not receive the PDCCH during the On Duration, the UE may switch to the sleep state when the On Duration ends. In this case, in the On Duration in which data transmission/reception is not performed, the UE may unnecessarily wake up and perform PDCCH monitoring.

When considering the characteristics of UE traffic that bursts, (during the On Duration period of the terminal), the proportion of the On Duration period in which only PDCCH monitoring is performed without actually performing data transmission/reception is high, this may cause power waste of the UE. As such, there is a need to reduce power waste caused by unnecessary PDCCH monitoring.

Also, when data is transmitted/received for a short period of time in the On Duration that transmits and receives data, the UE may monitor the PDCCH while maintaining the DRX ON state for the entire duration of the DRX inactivity time. If a long DRX inactivity time remains even though there is no more data to be received by the UE, there is a problem in that the UE may unnecessarily perform PDCCH monitoring. It is also necessary to reduce the power waste caused by this.

In order to prevent the power waste where the transmission/reception of data was ended in a specific On Duration but the DRX inactivity time was long so that the UE could not sleep quickly, the network may transmit a go-to-sleep signal (GTS) to the terminal.

In addition, when the terminal wakes up and operates in the On Duration, but there is no data to be transmitted/received, the network may transmit a go-to-sleep signal (GTS) to the terminal so that the terminal is no longer awake and sleeps quickly.

When this GTS is transmitted and the UE detects it, or when the GTS indicates that the UE is to sleep, the UE may end DRX ON and sleep.

As an example of GTS for allowing the UE to sleep without further monitoring data, a DRX Command MAC CE may be provided, and the DRX Command MAC CE at this time may correspond to information transmitted by the network to the UE.

Upon receiving the DRX Command MAC CE, the UE may stop drx-onDurationTimer and drx-InactivityTimer. Accordingly, the UE can switch to the DRX OFF state without monitoring for new data.

The 'operation when the network transmits the DRX Command MAC CE to the terminal and the terminal receives the DRX Command MAC CE' described above may be described as follows.

1> if a DRX Command MAC CE or a Long DRX Command MAC CE is received:
2> stop drx-onDurationTimer;
2> stop drx-InactivityTimer.

Other types of GTS transmission may be provided. For example, for a more dynamic sleep indication, it may be considered that the UE is instructed to sleep in the form of a reference signal (RS) and/or PDCCH. The GTS may be transmitted in the form of a signal such as a Channel State Information Reference Signal (CSI-RS) or a Tracking Reference Signal (TRS), or may be transmitted in the form of a channel such as PDCCH.

On the other hand, although the base station (e.g. gNB) determines that there is no more data to be transmitted to the UE and the base station transmits the GTS to the terminal, there is a possibility that the base station may generate additional data to be transmitted to the terminal after some time.

In this case, if the UE switches to the sleep state, a latency problem may occur in which the UE must wait until the next DRX on duration for data transmission. On the other hand, when the UE does not switch to the sleep state and continuously monitors data (e.g., PDCCH monitoring) during the inactivity time, unnecessary power waste may occur.

Accordingly, in the present specification, methods in which the UE can receive (additionally) data while performing an operation for power saving by receiving the GTS are proposed.

Depending on the configuration of the base station or the type of service, the UE may perform the above-described conventional C-DRX operation and then operate according to at least one of the embodiments to be described later. That is, the UE may support both the existing C-DRX operation and the embodiments to be described later.

Hereinafter, embodiments of the present specification will be described through the drawings. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 19:
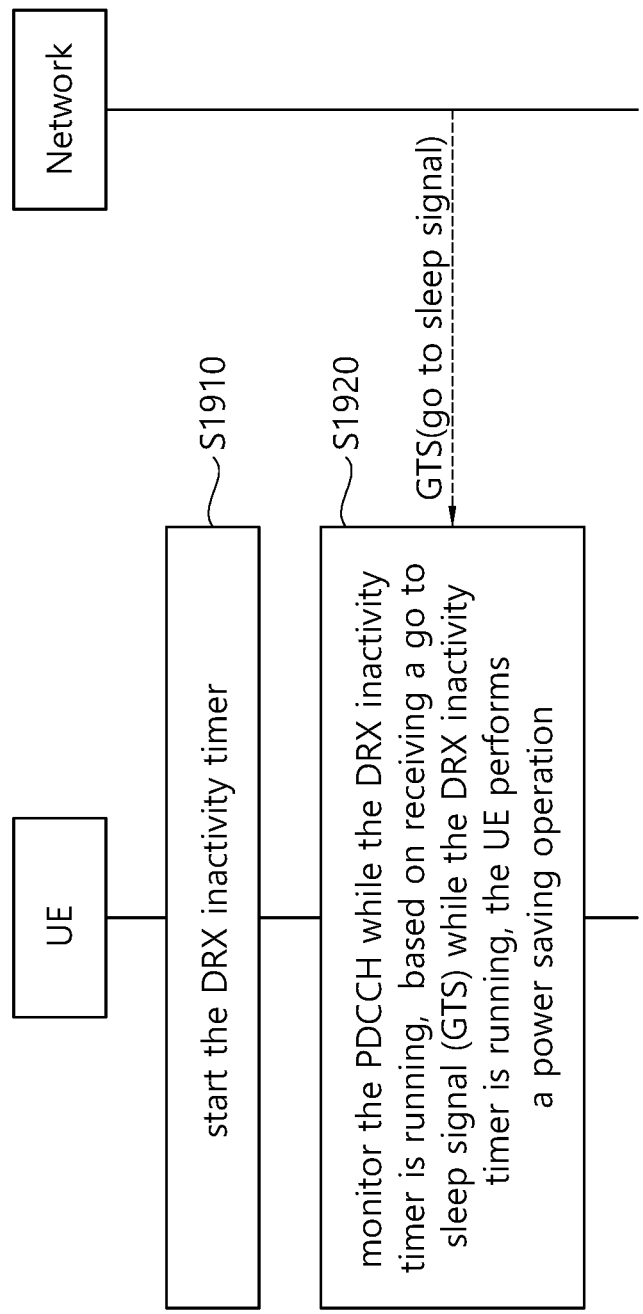
FIG. 19 schematically illustrates a flowchart of a PDCCH monitoring method according to an embodiment of the present specification.

FIG. 19 schematically illustrates a flowchart of a PDCCH monitoring method according to an embodiment of the present specification.

According to FIG. 19, the terminal may start the DRX inactivity timer (S1910).

Here, as described above, the DRX inactivity timer may be a timer that starts when a PDCCH is received while the DRX on duration timer is running (i.e., while the UE is monitoring the PDCCH).

In addition, as described above, the period in which the DRX on duration timer is operating may be referred to as DRX on duration, and the period in which the DRX in-activity timer is operating may be referred to as DRX inactivity time.

Here, the network (e.g. base station (e.g. eNB, gNB)) transmits DRX configuration information (or parameter) (for example, information for DRX on duration timer (e.g. a value of the DRX on duration timer, etc.), information for the DRX inactivity timer (e.g. a value of the DRX inactivity timer, etc.)) to the UE.

An example of DRX configuration information (or parameter) that the UE receives from the base station may be as follows. In this case, the DRX configuration information (or parameter) below may be transmitted from the base station to the terminal through a higher layer (e.g., RRC signaling, MAC signaling, etc.).

TABLE 4

```
-- ASN1START
-- TAG-DRX-CONFIG-START
DRX-Config ::=                SEQUENCE {
    drx-onDurationTimer,
    drx-InactivityTimer,
    drx-HARQ-RTT-TimerDL,
    drx-HARQ-RTT-TimerUL,
    drx-RetransmissionTimerDL,
    drx-RetransmissionTimerUL,
    drx-LongCycleStartOffset,
    shortDRX                  SEQUENCE {
        drx-ShortCycle,
        drx-ShortCycleTimer,  -- Need R
    drx-SlotOffset
}
-- TAG-DRX-CONFIG-STOP
-- ASN1STOP
```

Here, each parameter (or information) included in the DRX configuration information may be as follows. —drx-onDurationTimer: the duration at the beginning of a DRX Cycle. In other words, the value of the On Duration timer;

drx-SlotOffset: the delay before starting the drx-onDurationTimer;

drx-InactivityTimer: the duration after the PDCCH occasion in which a PDCCH indicates a new UL or DL transmission for the MAC entity. in other words, a value of the DRX inactivity timer;

drx-RetransmissionTimerDL: the maximum duration until a DL retransmission is received;

drx-RetransmissionTimerUL: the maximum duration until a grant for UL retransmission is received;

drx-LongCycleStartOffset: the Long DRX cycle and drx-StartOffset which defines the subframe where the Long and Short DRX Cycle starts;

drx-ShortCycle: the Short DRX cycle;

drx-ShortCycleTimer: the duration the UE shall follow the Short DRX cycle. In other words, a value of the DRX short timer;

drx-HARQ-RTT-TimerDL: the minimum duration before a DL assignment for HARQ retransmission is expected by the MAC entity;

drx-HARQ-RTT-TimerUL: the minimum duration before a UL HARQ retransmission grant is expected by the MAC entity.

The UE monitors the PDCCH while the DRX inactivity timer is running, based on receiving a go to sleep signal (GTS) while the DRX inactivity timer is running, the UE can perform a power saving operation (S1920). That is, when the UE receives the GTS (while monitoring the PDCCH because the DRX inactivity timer is running), the UE may perform a power saving operation.

Here, the term GTS may be expressed as information related to a power saving operation, which may mean information instructing the terminal to perform a power saving operation.

Hereinafter, embodiments of the present specification will be described through the drawings. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 20:
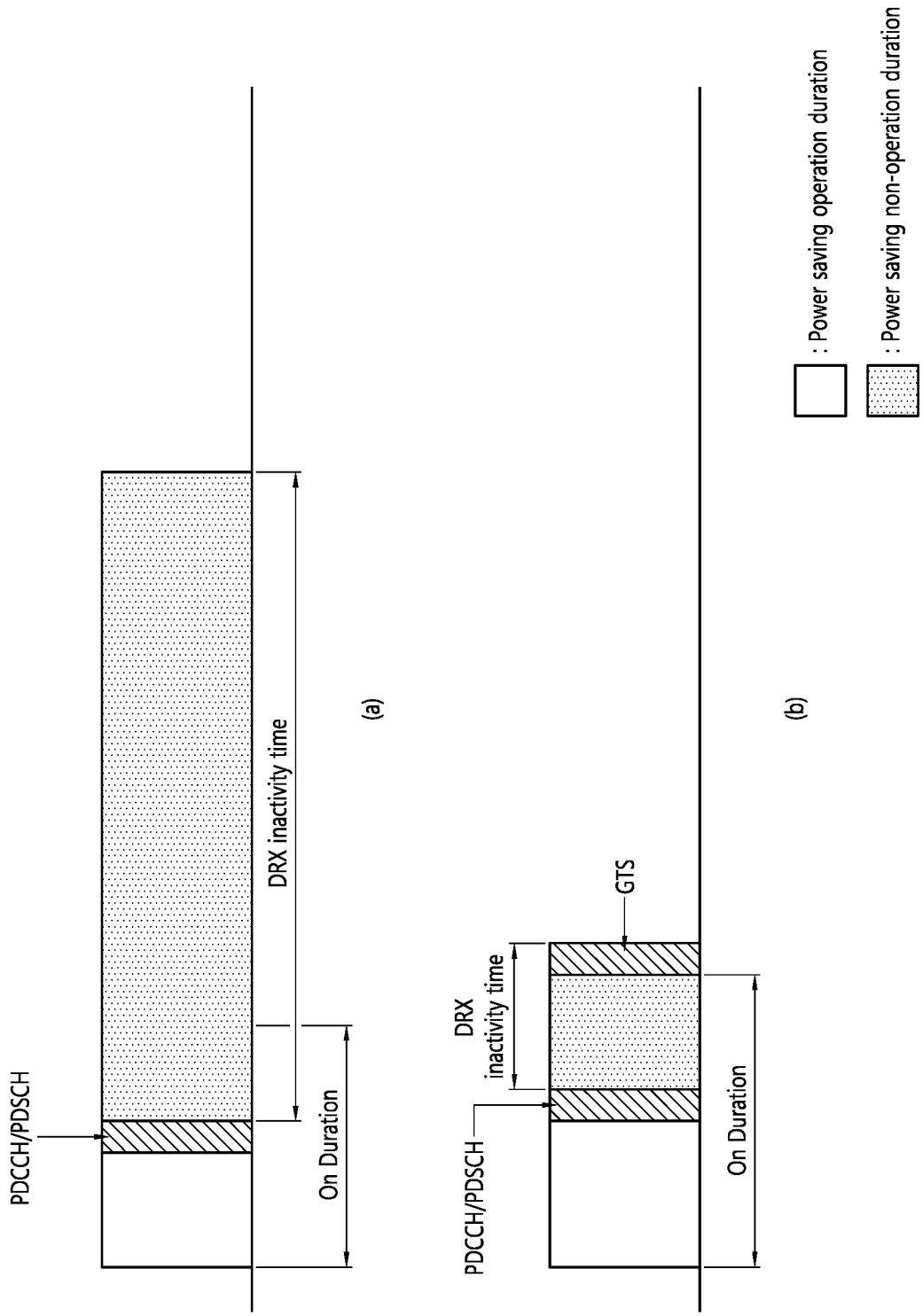
FIG. 20 schematically illustrates an embodiment of a GTS according to an example of the present specification.

FIG. 20 schematically illustrates an embodiment of a GTS according to an example of the present specification.

As shown in (a) of FIG. 20, when the UE receives the scheduling DCI during the On Duration, the operation of the DRX inactivity timer (drx-InactivityTimer) may be started. When the DRX inactivity time in which the DRX inactivity timer (drx-InactivityTimer) is operated expires, the UE may switch to the DRX OFF state and sleep.

Meanwhile, as shown in (b) of FIG. 20, the gNB transmits a GTS to the UE, so that the UE ends the On Duration and inactivity time, and quickly sleeps (or performs a power saving operation).

In this case, until the On Duration for power saving of the UE starts and the first scheduling DCI is not received or during a time period in which the DRX on duration timer (drx-onDurationTimer) operates but the DRX inactivity timer (drx-InactivityTimer) does not operate, the UE may consider monitoring the PDCCH while performing a power saving operation.

Here, that the power saving operation is performed and the PDCCH monitoring is performed, for example, it can mean (a) using a long period of PDCCH monitoring period, (b) applying a small number of PDCCH monitoring candidates, (c) monitoring PDCCH in a specific search space, and/or (d) a PDCCH monitoring in a specific or a small number of CORESETs, etc.

On the other hand, during other time periods or DRX inactivity time, the PDCCH can be monitored as before without performing a power saving operation.

During a time period in which the On Duration starts but before the first scheduling DCI is received or during a time period in which the DRX on duration timer (drx-onDurationTimer) operates but the DRX inactivity timer (drx-InactivityTimer) does not operate, the power saving operation performed by the terminal may be predetermined or may be set by a network.

For example, the network provides information (e.g. via the RRC message), which includes at least one (a) information related to the PDCCH monitoring period (e.g., a period is given by the number of slots and an offset for the period may be given), (b) information related to PDCCH monitoring candidates (e.g., the number of PDCCH candidates per aggregation level may be given), (c) information related to the search space to be used for PDCCH monitoring (e.g., the number of consecutive slots in which the search space is maintained) and (d) information related to CORESET to be performed PDCCH monitoring, to be applied during the time period to the terminal.

Hereinafter, for a more detailed description of FIG. 19, the present specification will describe examples in which a terminal performs a power saving operation based on a GTS through various embodiments described in the following methods. The methods described below correspond to embodiments that can be combined with each other unless they mutually cannot be combined. Of course, the embodiments disclosed herein may operate independently.

<Method 1>

Hereinafter, when the UE receives the GTS, it is proposed to end the inactivity time and/or the (existing) On Duration and start a (new) On Duration. Therefore, upon receiving the GTS, a power saving operation can be performed during the On Duration and PDCCH monitoring can be performed.

According to an embodiment, the terminal stops or expires the DRX inactivity timer and starts or restarts the DRX on duration timer based on receiving the GTS, and the The UE may monitor the PDCCH while the DRX on duration timer is running.

Here, for example, the terminal may transition to a sleep state based on not receiving the PDCCH while the DRX on duration timer is running.

Here, for example, the terminal restarts the DRX inactivity timer based on receiving the PDCCH while the DRX on duration timer is running, and the terminal may monitor another PDCCH while the DRX inactivity timer is running.

Here, for example, the duration of the DRX on duration timer may be shorter than the duration of the DRX inactivity timer.

More specifically, it is proposed that the UE operates as follows. In the present specification, it may also include performing all or only part of the following suggestions.

When the UE receives the GTS,

DRX Inactivity Timer (drx-InactivityTimer) is stopped or expired.

DRX on duration timer (drx-onDurationTimer) is started or restarted.

(When a short DRX cycle is configured) drx-ShortCycleTimer is started or restarted.

When performing the above operation, for example, it can be operated as follows.

For example, if the UE receives the GTS during the DRX inactivity time, the DRX inactivity time may end and the On Duration may begin. In this case, the UE may additionally perform a power saving operation during the On Duration and perform PDCCH monitoring.

For convenience of understanding, an example of the GTS according to Method 1 will be described with reference to the drawings as follows. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 21:
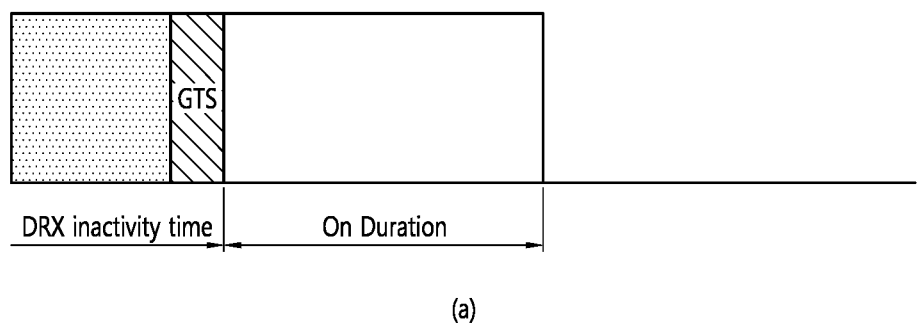
FIG. 21 schematically illustrates an embodiment of a GTS according to another example of the present specification.
Figure 21:
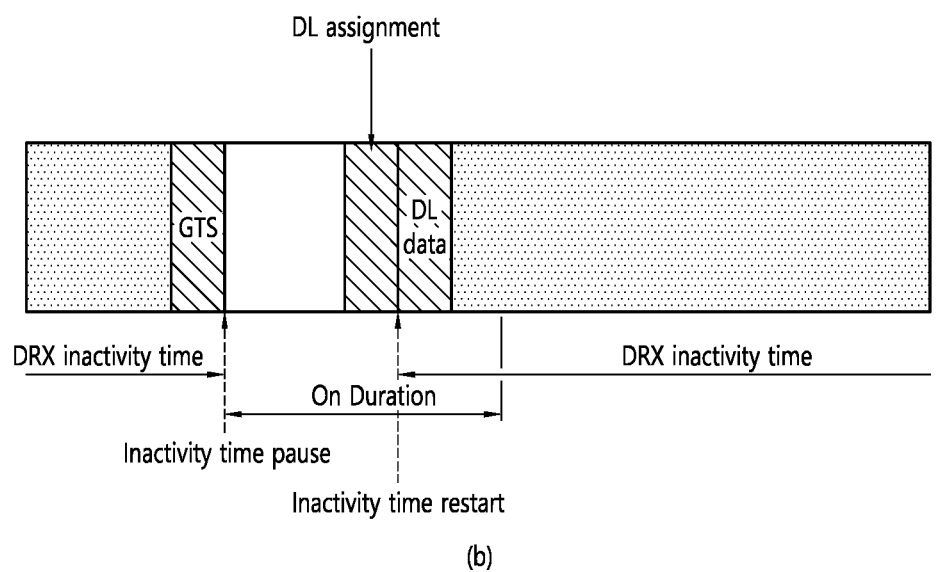

FIG. 21 schematically illustrates an embodiment of a GTS according to another example of the present specification.

According to FIG. 21, if the UE does not receive a PDCCH for scheduling a new transmission during the On Duration, the DRX on duration timer (drx-onDurationTimer) expires and the UE may enter a sleep state. An example of this is illustrated in (a) of FIG. 21.

On the other hand, when the UE receives a PDCCH for scheduling a new transmission during the On Duration, the DRX inactivity time may be started again by starting the operation of the DRX-InactivityTimer. An example of this is shown in (b) of FIG. 21.

<Method 2>

Hereinafter, when the UE receives the GTS, it is proposed to temporarily pause the inactivity time/On Duration and perform a power saving operation for a predetermined time. When the execution period of the power saving operation ends, the terminal may resume the paused inactivity time/On Duration.

In this case, performing the power saving operation may mean all or part of the following.

1) performing (micro) sleep
2) not monitoring PDCCH
3) performing power saving operation and performing PDCCH monitoring
  (a) using a long period of PDCCH monitoring period
  (b) applying a small number of PDCCH monitoring candidates
  (c) PDCCH monitoring in a specific search space
  (d) PDCCH monitoring at a specific or small number of CORESETs According to an embodiment, the terminal may stop or pause the DRX inactivity timer and the DRX on duration timer based on receiving the GTS, and the terminal may start or restart the GTS timer.

Here, for example, the terminal may perform the power saving operation while the GTS timer is running.

Here, for example, the terminal may not monitor the PDCCH while the GTS timer is running.

Here, for example, while the GTS timer is running, the UE monitors the PDCCH based on a long period of PDCCH monitoring period, a small number of PDCCH monitoring candidates, a specific search space, or a specific or small number of control resource sets (CORESETs).

Here, for example, the terminal may stop or expire the GTS timer and start or restart the DRX inactivity timer based on receiving the PDCCH while the GTS timer is running.

Here, for example, based on the expiration of the GTS timer, the terminal may resume the DRX inactivity timer or the DRX on duration timer.

More specifically, it is proposed that the UE operates as follows. In the present specification, it may include performing all or only part of the following suggestions.

When the UE receives the GTS,
  the DRX inactivity timer (drx-InactivityTimer) may be stopped (or paused).
  the DRX on duration timer (drx-onDurationTimer) may be stopped (or paused)
  the GTX timer (GTS-timer) is started or restarted.

In this case, the initial value of the GTS timer may be configured through DCI, RRC, and/or MAC CE. Or, it may be a value defined in the specification. Characteristically, the initial value of the GTS timer can be configured through GTS. In addition, characteristically, the GTS timer may operate in units of slots.

Here, if the initial value of the GTS timer is configured through RRC, the initial value of the GTS timer may be included in the DRX configuration information described above.

While the GTS timer is running, the UE may perform the aforementioned power saving operation.

Alt 1. Performing (micro) sleep

In this case, while the GTS timer is operating, it may be excluded from the active time. However, while the drx-RetransmissionTimerDL or drx-RetransmissionTimerUL or ra-ContentionResolutionTimer is operating, it may be included in the active time even if the GTS timer is operating. Here, ra-ContentionResolutionTimer may correspond to a contention resolution timer.

Alt 2. Not monitoring PDCCH

In this case, while the GTS timer is running, it may be excluded from the active time. However, while the drx-RetransmissionTimerDL or drx-RetransmissionTimerUL or ra-ContentionResolutionTimer is operating, it may be included in the active time even if the GTS timer is operating.

Alt 3. Performing power saving operation and performing PDCCH monitoring
  (a) using a long period of PDCCH monitoring period
  (b) applying a small number of PDCCH monitoring candidates
  (c) PDCCH monitoring in a specific search space
  (d) PDCCH monitoring at a specific or small number of CORESETs In this case, a time period in which the GTS timer is operated may be included in the active time. However, even if the GTS timer is operating, while the drx-RetransmissionTimerDL or drx-RetransmissionTimerUL or ra-ContentionResolutionTimer is operating, the PDCCH monitoring is not performed by performing a power saving operation and the existing active PDCCH monitoring can be performed.

When the GTS timer expires,
  DRX inactivity timer (drx-InactivityTimer) may be resumed.
  DRX on duration timer (drx-onDurationTimer) may be resumed.

At this time, the DRX inactivity timer (drx-InactivityTimer) and/or the DRX on duration timer (drx-onDurationTimer) operate in units of 1 msec, while the GTS timer may operate in units of slots.

In this case, after the GTS timer expires, in the fastest subframe boundary, the operation of the DRX inactivity timer (drx-InactivityTimer) and/or the DRX on duration timer (drx-onDurationTimer) may be resumed. Or, after the GTS timer expires, the operation of the DRX inactivity timer (drx-InactivityTimer) and/or DRX on duration timer (drx-onDurationTimer) can be resumed at the fastest 1 msec boundary.

When new data is scheduled during active time (when the GTS timer is running),
  The GTS timer can be stopped or expired.
  DRX Inactivity Timer (drx-InactivityTimer) can be started or restarted.

When performing the above operation, for example, it can be operated as follows.

For example, if the UE receives GTS during the DRX inactivity time, the DRX inactivity time is stopped (the DRX inactivity timer (drx-InactivityTimer) is paused), a GTS time being a period in which the GTS timer operates may be started.

For convenience of understanding, an example of the GTS according to Method 2 will be described with reference to the drawings as follows. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 22:
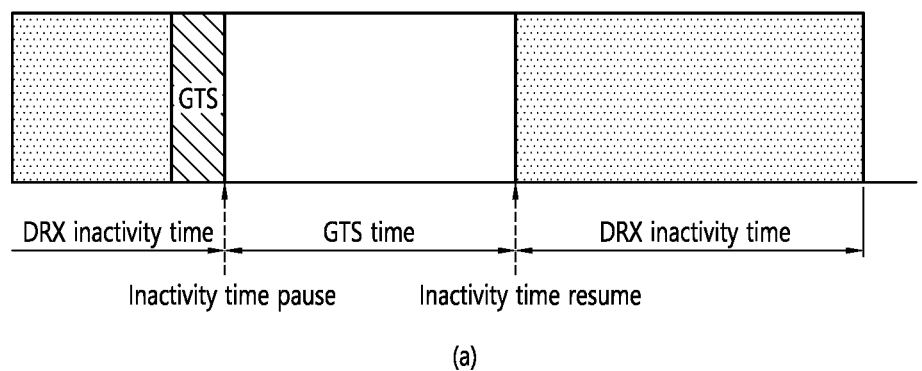
FIG. 22 schematically illustrates an embodiment of a GTS according to another example of the present specification.
Figure 22:
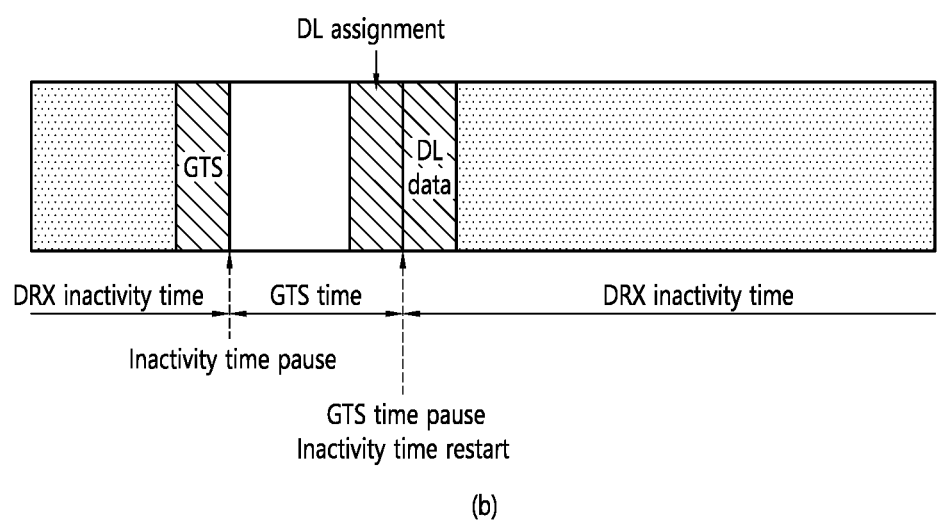

FIG. 22 schematically illustrates an embodiment of a GTS according to another example of the present specification.

According to FIG. 22, when the GTS-time expires, the DRX inactivity time resumes (the drx-InactivityTimer resumes). This example is shown in (a) of FIG. 22.

On the other hand, if the UE receives new data scheduled during this GTS-time, the GTS time ends and the DRX inactivity time (DRX inactivity timer (drx-InactivityTimer) resumes) is reset and can be restarted. This example is shown in (b) of FIG. 22.

<Method 3>

Here, it is proposed that, when the UE receives GTS, the inactivity time/On Duration continues to operate but the UE performs the power saving operation during a specific time duration.

In this case, that the power saving operation can be performed may mean all or part of the following.
  1) performing (micro) sleep
  2) not monitoring PDCCH
  3) performing power saving operation and performing PDCCH monitoring
    (a) using a long period of PDCCH monitoring period
    (b) applying a small number of PDCCH monitoring candidates
    (c) PDCCH monitoring in a specific search space
    (d) PDCCH monitoring at a specific or small number of CORESETs More specifically, the UE proposes to operate as follows. In the present specification, it may include performing all or only part of the following suggestions.

When the UE receives the GTS,
  It is possible to start or restart the GTS timer.

In this case, the initial value of the GTS timer may be configured through DCI, RRC, and/or MAC CE. Or, it may be a value defined in the specification. Characteristically, the initial value of the GTS timer can be configured through GTS. In addition, characteristically, the GTS timer can operate in units of slots.

While the GTS timer is running, the UE may perform the aforementioned power saving operation.

Alt 1. Performing (micro) sleep

In this case, while the GTS timer is running, it may be excluded from the active time. However, while the drx-RetransmissionTimerDL or drx-RetransmissionTimerUL or ra-ContentionResolutionTimer is operating, it may be included in the active time even if the GTS timer is operating.

Alt 2. Not monitoring the PDCCH

In this case, while the GTS timer is running, it may be excluded from the active time. However, while the drx-RetransmissionTimerDL or drx-RetransmissionTimerUL or ra-ContentionResolutionTimer is operating, it may be included in the active time even if the GTS timer is operating.

Alt 3. Performing power saving operation and performing PDCCH monitoring
  (a) using a long period of PDCCH monitoring period
  (b) applying a small number of PDCCH monitoring candidates
  (c) PDCCH monitoring in a specific search space
  (d) PDCCH monitoring at a specific or small number of CORESETs In this case, a time period in which the GTS timer is operated may be included in the active time. However, even if the GTS timer is operating, while the drx-RetransmissionTimerDL or drx-RetransmissionTimerUL or ra-ContentionResolutionTimer is operating, the PDCCH monitoring is not performed by performing a power saving operation, and the existing active PDCCH monitoring can be performed.

When both the DRX on duration timer (drx-onDurationTimer) and the DRX inactivity timer (drx-InactivityTimer) expire while the GTS timer is running,
  The GTS timer can be stopped or expired.
When new data is scheduled during active time (when the GTS timer is running),
  The GTS timer can be stopped or expired.
  DRX Inactivity Timer (drx-InactivityTimer) can be started or restarted.

When performing such an operation, for example, it can be operated as follows.

For example, when the UE receives the GTS during the DRX inactivity time, the GTS time, which is an interval in which the GTS timer operates, may start. During this GTS time, the UE may perform a power saving operation.

For convenience of understanding, an example of the GTS according to Method 3 will be described with reference to the drawings as follows. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 23:
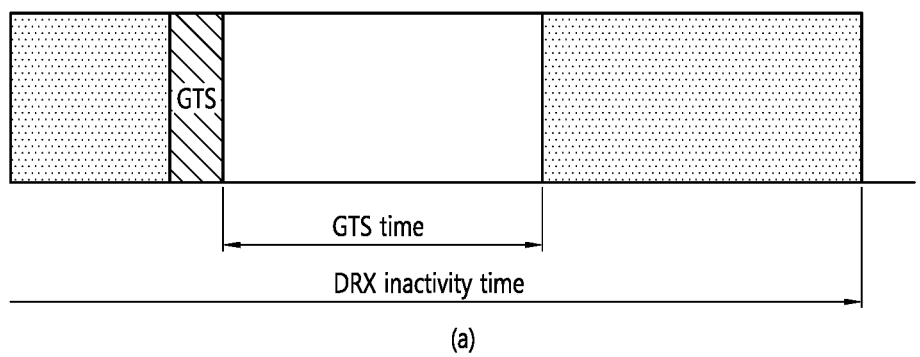
FIG. 23 schematically illustrates an embodiment of a GTS according to another example of the present specification.
Figure 23:
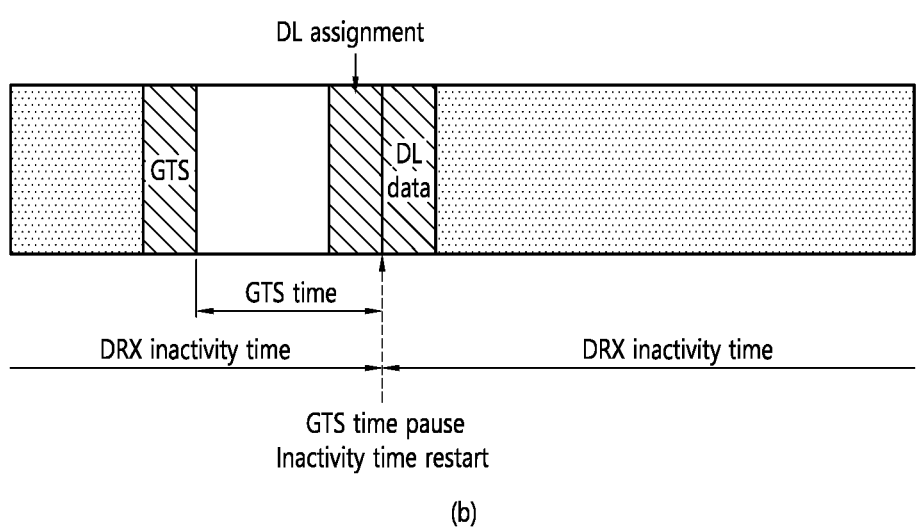

FIG. 23 schematically illustrates an embodiment of a GTS according to another example of the present specification.

According to FIG. 23, when the GTS timer expires, the UE may perform PDCCH monitoring without performing a power saving operation. This example is shown in (a) of FIG. 23.

On the other hand, if the UE receives new data scheduled during the GTS time, the GTS time is ended and the DRX inactivity time may be reset and restarted (DRX inactivity timer (drx-InactivityTimer) resumes (or restarts)). This example is shown in (b) of FIG. 23.

<Method 4>

It is proposed that, when the UE receives GTS, the inactivity time/On Duration is terminated and the UE performs the power saving operation during a specific time duration.

In this case, performing the power saving operation may mean all or part of the following.

1) performing the power saving operation and PDCCH monitoring.

(a) using a long period of PDCCH monitoring period
  (b) applying a small number of PDCCH monitoring candidates
  (c) PDCCH monitoring in a specific search space
  (d) PDCCH monitoring at a specific or small number of CORESETs 2) monitoring wake-up signal (WUS)

In this case, the WUS is a signal indicating that the UE wakes up, and may be transmitted in the form of a signal or may be transmitted in the form of a channel such as PDCCH. Here, for example, WUS may mean information indicating that the terminal exits from the power saving state.

More specifically, the UE proposes to operate as follows. In the present specification, it may include performing all or only part of the following suggestions.

When the UE receives the GTS,
  DRX Inactivity Timer (drx-InactivityTimer) may be stopped or expired.
  DRX on duration timer (drx-onDurationTimer) may be stopped or expired.
  the GTS timer may be started or restarted.
  (when a short DRX cycle is configured) drx-ShortCycleTimer may be started or restarted.

In this case, the initial value of the GTS timer may be configured through DCI, RRC, and/or MAC CE. Or, it may be a value defined in the specification. Characteristically, the initial value of the GTS timer can be configured through GTS. In addition, characteristically, the GTS timer can operate in units of slots.

While the GTS timer is running, the UE may perform the aforementioned power saving operation.

Alt 1. Power saving operation and PDCCH monitoring
  (a) using a long period of PDCCH monitoring period
  (b) applying a small number of PDCCH monitoring candidates
  (c) PDCCH monitoring in a specific search space
  (d) PDCCH monitoring at a specific or small number of CORESETs In this case, a time period in which the GTS timer is operated may be included in the active time. However, even if the GTS timer is operating, while the drx-RetransmissionTimerDL or drx-RetransmissionTimerUL or ra-ContentionResolutionTimer is operating, the PDCCH monitoring is not performed by performing a power saving operation, and the existing active PDCCH monitoring can be performed.

Alt 2. Performing WUS monitoring

In this case, the time interval in which the GTS timer operates may not be included in the active time. However, even if the GTS timer is operating, it is determined that it is an active time while the drx-RetransmissionTimerDL or drx-RetransmissionTimerUL or ra-ContentionResolutionTimer is operating, and the existing active PDCCH monitoring can be performed.

When new data is scheduled during active time (during which the GTS timer is running),
  the GTS timer may be stopped or expired.
  DRX Inactivity Timer (drx-InactivityTimer) may be started or restarted.
When WUS is found (while the GTS timer is running),
  the GTS timer may be stopped or expired.
  the DRX on duration timer (drx-onDurationTimer) or the DRX inactivity timer (drx-InactivityTimer) is started or restarted.

When performing such an operation, for example, it can be operated as follows.

For example, when the UE receives the GTS during the DRX inactivity time, the GTS time, which is an interval in which the GTS timer operates, may start. During this GTS time, the UE may perform a power saving operation.

For convenience of understanding, an example of the GTS according to Method 4 will be described with reference to the drawings as follows. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 24:
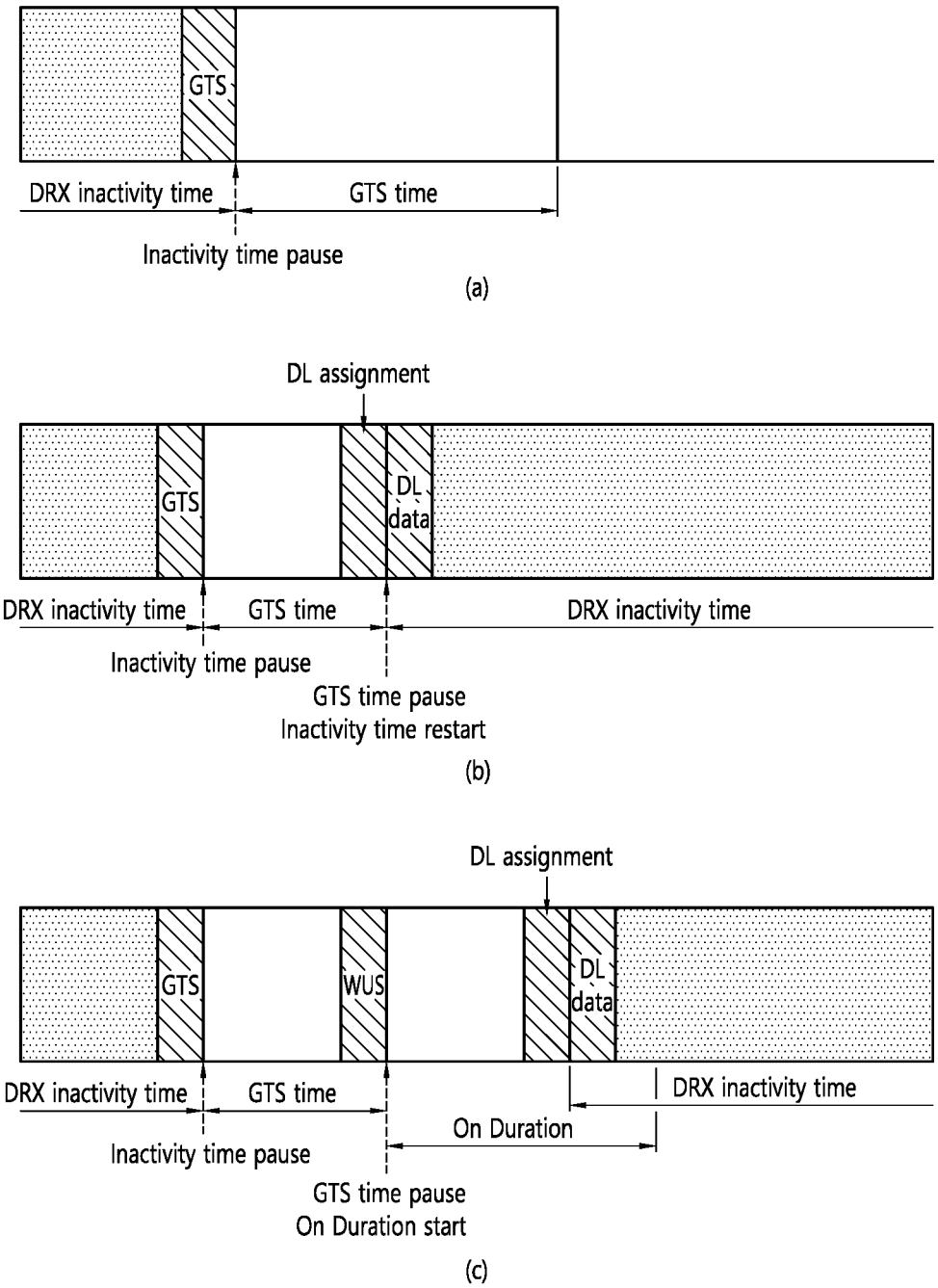
FIG. 24 schematically illustrates an embodiment of a GTS according to another example of the present specification.

FIG. 24 schematically illustrates an embodiment of a GTS according to another example of the present specification.

According to FIG. 24, when the GTS timer expires without scheduling new data or discovering WUS, it may switch to a sleep state. This example is shown in (a) of the FIG. 24.

On the other hand, if the UE receives new data scheduled during this GTS time, the GTS time ends and the DRX inactivity time may be restarted (the DRX inactivity timer (drx-InactivityTimer) may be resumed). This example is shown in (b) of FIG. 24.

As another example, during the GTS time, the UE monitors the WUS and the WUS may be discovered. In this case, after the WUS is discovered, the On Duration starts at the promised time, so that the UE can perform PDCCH monitoring again to receive data. This example is shown in (c) of FIG. 24.

Returning to FIG. 19 again, characteristically, the gNB may give the UE an indication of which of the operating methods when the UE receives the GTS, including the above-described method, will be used. This indication may be transmitted through RRC, MAC CE, DCI, or the like. Characteristically, such an indication may be transmitted through the GTS.

Here, a method, in which the gNB indicates to the UE which method including the above method to operate when the UE receives the GTS, can be applied to all of the methods 1 to 4 described above. Through the contents of the above specification, it may be possible for the UE to receive the GTS to receive additional data while performing an operation for power saving.

Hereinafter, an embodiment of the present specification described above will be described in terms of a terminal through the drawings. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 25:
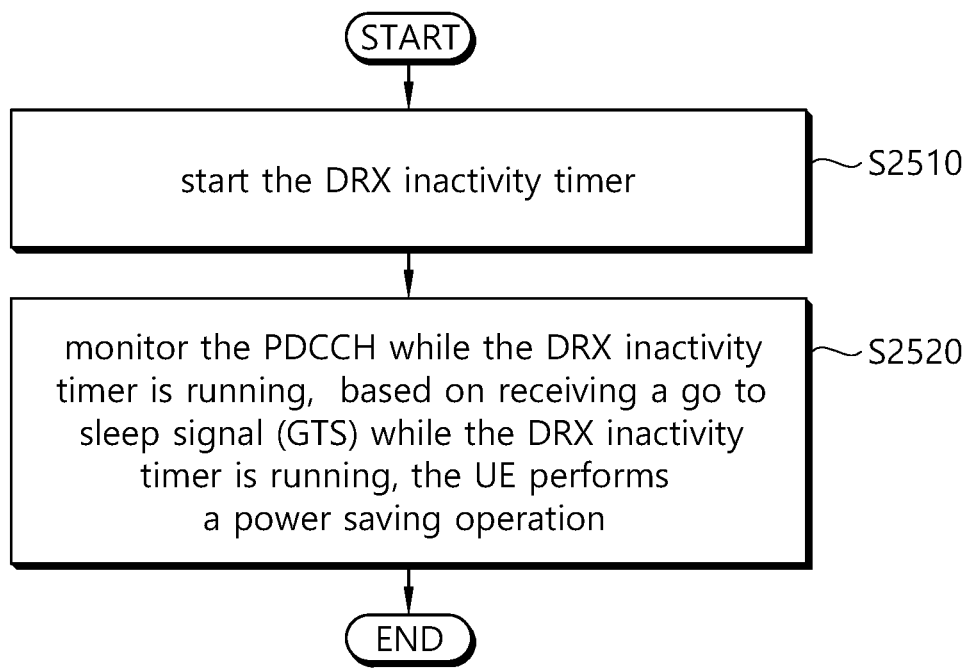
FIG. 25 is a schematic flowchart of a method for monitoring a PDCCH by a terminal according to an embodiment of the present specification.

FIG. 25 is a schematic flowchart of a method for monitoring a PDCCH by a terminal according to an embodiment of the present specification.

According to FIG. 25, the terminal may start the DRX inactivity timer (S2510). Here, a specific example in which the terminal starts the DRX inactivity timer is the same as described above, and thus, in order to avoid repetitive description, description of overlapping contents will be omitted.

The UE monitors the PDCCH while the DRX inactivity timer is running, based on receiving a go to sleep signal (GTS) while the DRX inactivity timer is running, the UE can perform a power saving operation (S2520). Here, the specific example for the UE performing the power saving operation based on the UE receiving a go to sleep signal (GTS) while the DRX inactivity timer is running is the same as described above, and thus, in order to avoid repetitive description, description of overlapping contents will be omitted.

Figure 26:
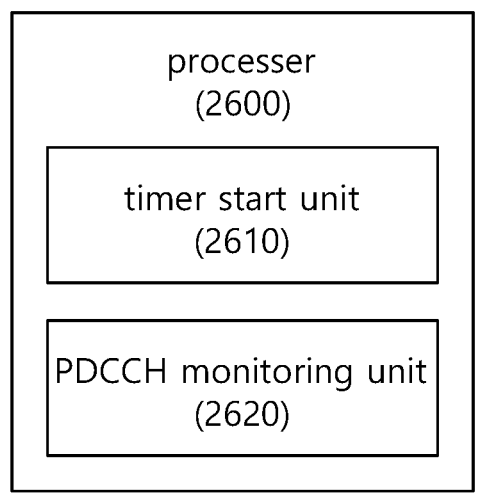
FIG. 26 is a schematic block diagram of a method for monitoring a PDCCH by a terminal according to an embodiment of the present specification.

FIG. 26 is a schematic block diagram of a method for monitoring a PDCCH by a terminal according to an embodiment of the present specification.

Referring to FIG. 26, the processor 2600 may include a timer start unit 2610 and a PDCCH monitoring unit 2620. For example, the processor 2600 here may correspond to a processor to be described later.

The timer start unit 2610 may start the DRX inactivity timer. Here, a specific example in which the terminal starts the DRX inactivity timer is the same as described above, and thus, in order to avoid repetitive description, description of overlapping contents will be omitted.

The PDCCH monitoring unit 2620 monitors the PDCCH while the DRX inactivity timer is running, based on receiving a go to sleep signal (GTS) while the DRX inactivity timer is running, the UE can perform a power saving operation. Here, the specific example for the UE performing the power saving operation based on the UE receiving a go to sleep signal (GTS) while the DRX inactivity timer is running is the same as described above, and thus, in order to avoid repetitive description, description of overlapping contents will be omitted.

Hereinafter, an embodiment of the present specification described above will be described in terms of a base station through the drawings. The following drawings are prepared to describe a specific example of the present specification. Since the names of specific devices or names of specific signals/messages/fields described in the drawings are provided by way of example, the technical features of the present specification are not limited to the specific names used in the following drawings.

Figure 27:
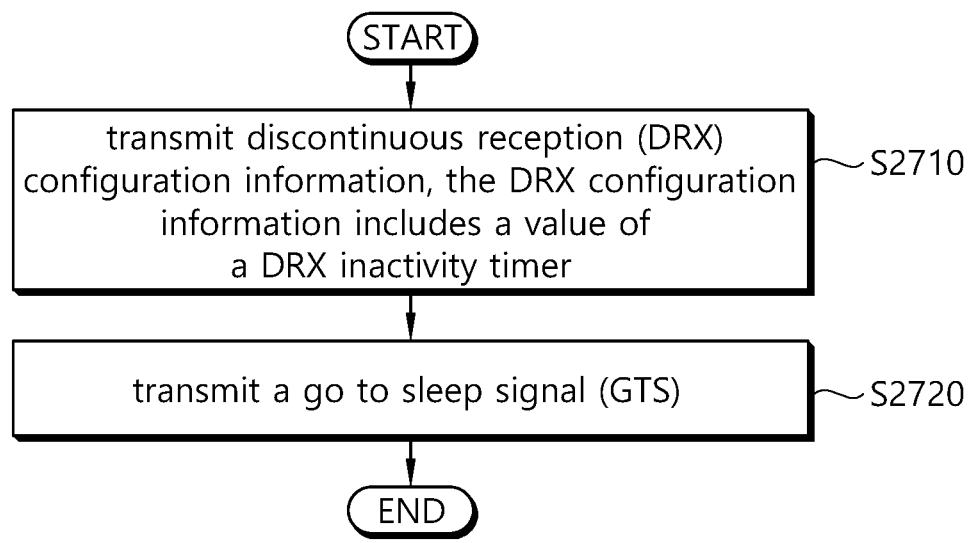
FIG. 27 is a schematic flowchart of a GTS transmission method by a base station according to an embodiment of the present specification.

FIG. 27 is a schematic flowchart of a GTS transmission method by a base station according to an embodiment of the present specification.

Referring to FIG. 27, the base station transmits discontinuous reception (DRX) configuration information, the DRX configuration information may include a value of a DRX inactivity timer (S2710). Here, a specific example in which the base station transmits DRX (Discontinuous Reception) configuration information is the same as described above, and thus, in order to avoid repetitive description, the description of duplicated content will be omitted.

The base station may transmit a go to sleep signal (GTS) (S2720). Here, since a specific example of transmitting a go to sleep signal (GTS) by the base station is the same as described above, description of overlapping content will be omitted to avoid repeated description.

Figure 28:
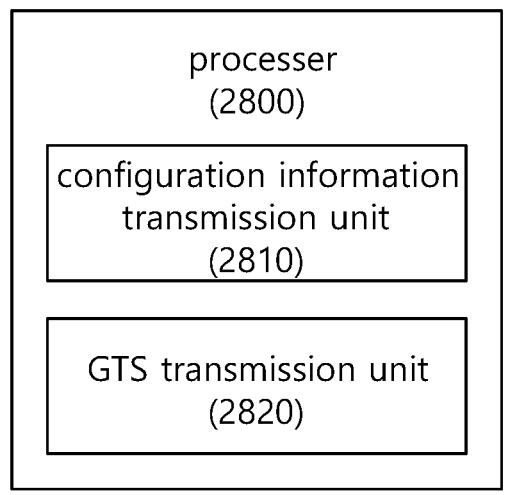
FIG. 28 is a schematic block diagram of a GTS transmission method by a base station according to an embodiment of the present specification.

FIG. 28 is a schematic block diagram of a GTS transmission method by a base station according to an embodiment of the present specification.

Referring to FIG. 28, the processor 2800 may include a configuration information transmission unit 2810 and a GTS transmission unit 2820. For example, the processor 2800 here may correspond to a processor to be described later.

The configuration information transmission unit 2810 transmits discontinuous reception (DRX) configuration information, the DRX configuration information may include a value of a DRX inactivity timer. Here, a specific example in which the base station transmits DRX (Discontinuous Reception) configuration information is the same as described above, and therefore, in order to avoid repetitive description, the description of the duplicated content will be omitted.

The GTS transmission unit (2820) may transmit a go to sleep signal (GTS). Here, since a specific example of transmitting a go to sleep signal (GTS) by the base station is the same as described above, description of overlapping content will be omitted to avoid repeated description.

Figure 29:
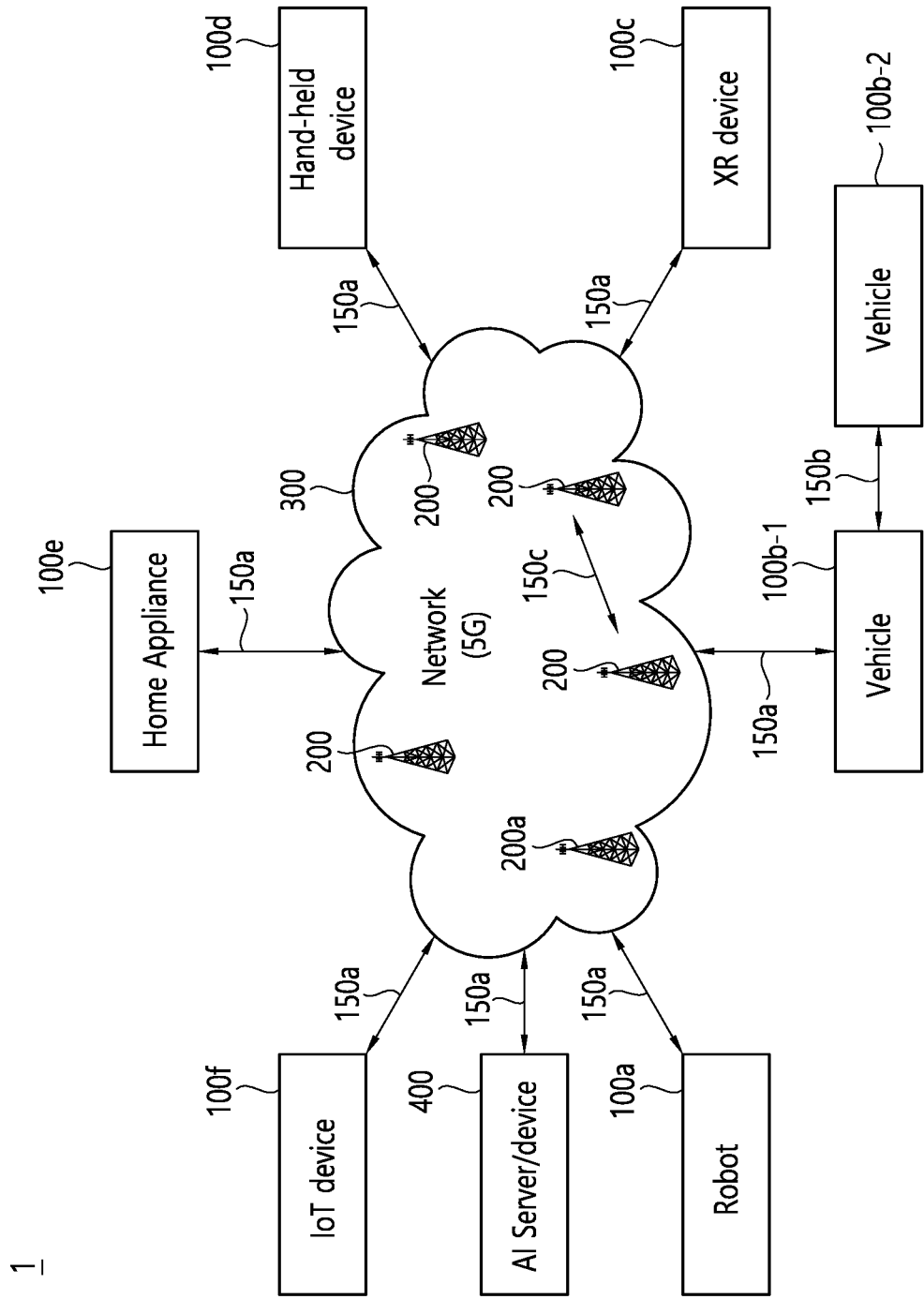
FIG. 29 shows an exemplary communication system (1), according to an embodiment of the present specification.

FIG. 29 shows an exemplary communication system (1), according to an embodiment of the present specification.

Referring to FIG. 29, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An Artificial Intelligence (AI) technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or D2D communication), or inter BS communication (150c) (e.g., relay, Integrated Access Backhaul (IAB)). The wireless devices and the BSs/the wireless devices may transmit/receive radio signals to/from each other through the wireless communication/connections (150a, 150b, 150c). For example, the wireless communication/connections (150a, 150b, 150c) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise. An NR frequency band may be defined as two different types of frequency ranges (FR1, FR2). The values of the frequency ranges may be changed (or varied), and, for example, the two different types of frequency ranges (FR1, FR2) may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 5

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 30:
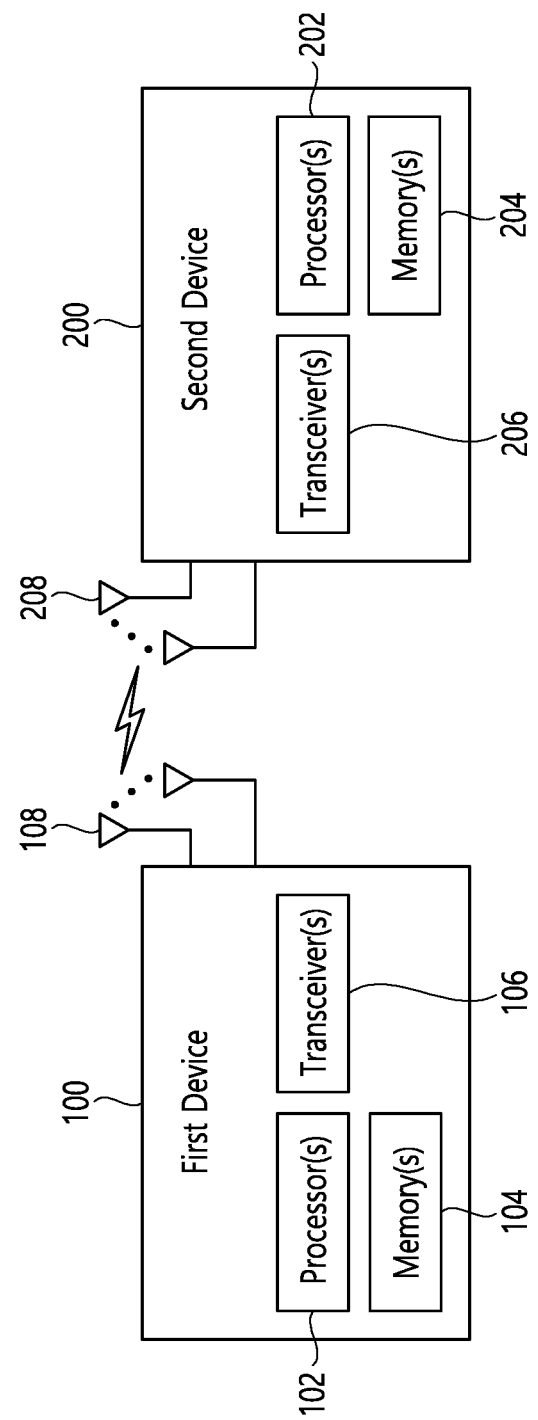
FIG. 30 shows an exemplary wireless device to which the present specification can be applied.

Hereinafter, an example of wireless devices to which the present specification is applied will be described in detail. FIG. 30 shows an exemplary wireless device to which the present specification can be applied.

Referring to FIG. 30, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 29.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Hereinafter, an example of a signal processing circuit to which the present specification is applied will be described in detail.

Figure 31:
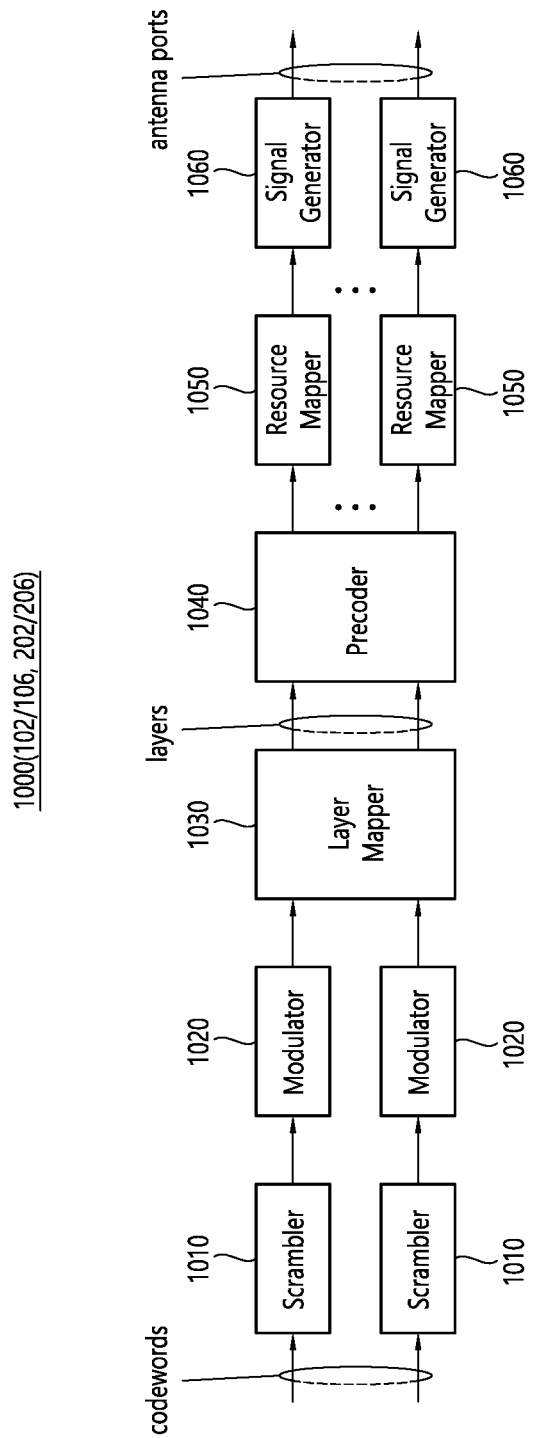
FIG. 31 shows a signal process circuit for a transmission signal according to an embodiment of the present specification.

FIG. 31 shows a signal process circuit for a transmission signal according to an embodiment of the present specification.

Referring to FIG. 31, a signal processing circuit (1000) may include scramblers (1010), modulators (1020), a layer mapper (1030), a precoder (1040), resource mappers (1050), and signal generators (1060). An operation/function of FIG. 31 may be performed, without being limited to, the processors (102, 202) and/or the transceivers (106, 206) of FIG. 30. Hardware elements of FIG. 31 may be implemented by the processors (102, 202) and/or the transceivers (106, 206) of FIG. 30. For example, blocks 1010~1060 may be implemented by the processors (102, 202) of FIG. 30. Or, the blocks 1010~1050 may be implemented by the processors (102, 202) of FIG. 30 and the block 1060 may be implemented by the transceivers (106, 206) of FIG. 30.

Codewords may be converted into radio signals via the signal processing circuit (1000) of FIG. 31. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010~1060) of FIG. 31. For example, the wireless devices (e.g., 100, 200 of FIG. 30) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 32:
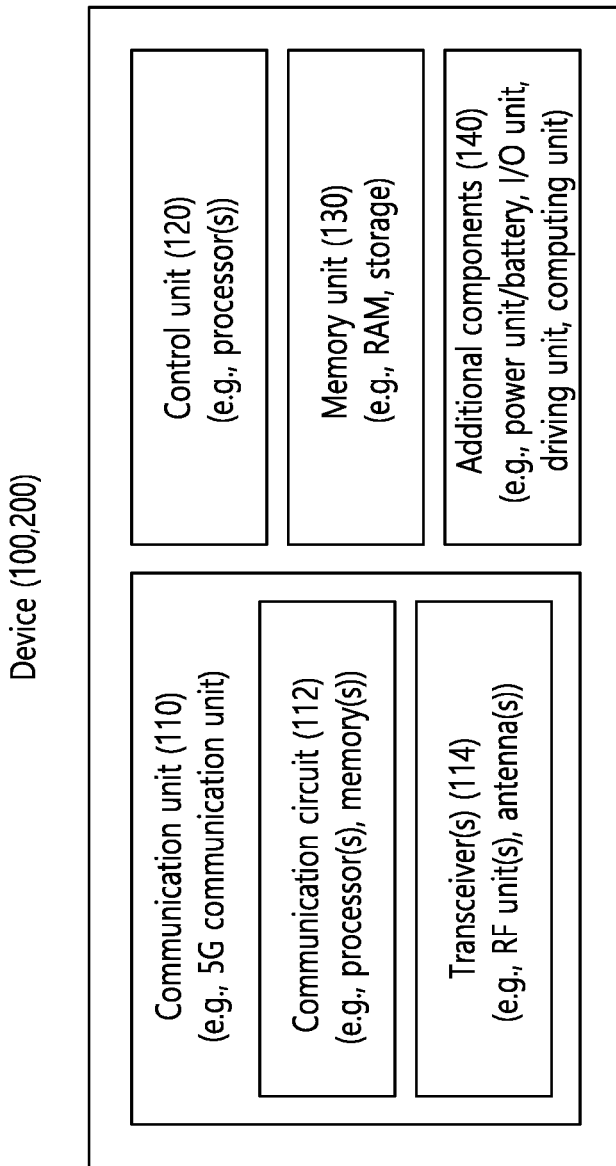
FIG. 32 shows another example of a wireless device according to an embodiment of the present specification.

FIG. 32 shows another example of a wireless device according to an embodiment of the present specification. The wireless device may be implemented in various forms according to a use-case/service (refer to FIG. 29).

Referring to FIG. 32, wireless devices (100, 200) may correspond to the wireless devices (100, 200) of FIG. 30 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 30. For example, the transceiver(s) (114) may include the one or more transceivers (106, 206) and/or the one or more antennas (108, 208) of FIG. 30. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 29), the vehicles (100b-1, 100b-2 of FIG. 29), the XR device (100c of FIG. 29), the hand-held device (100d of FIG. 29), the home appliance (100e of FIG. 29), the IoT device (100f of FIG. 29), a digital broadcast terminal, a hologram device, a public safety device, an MTC device, a medicine device, a fintech device (or a finance device), a security device, a climate/environment device, the AI server/device (400 of FIG. 29), the BSs (200 of FIG. 29), a network node, and so on. The wireless device may be used in a mobile or fixed place according to a usage-example/service.

In FIG. 32, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 32 will be described in detail with reference to the drawings.

Figure 33:
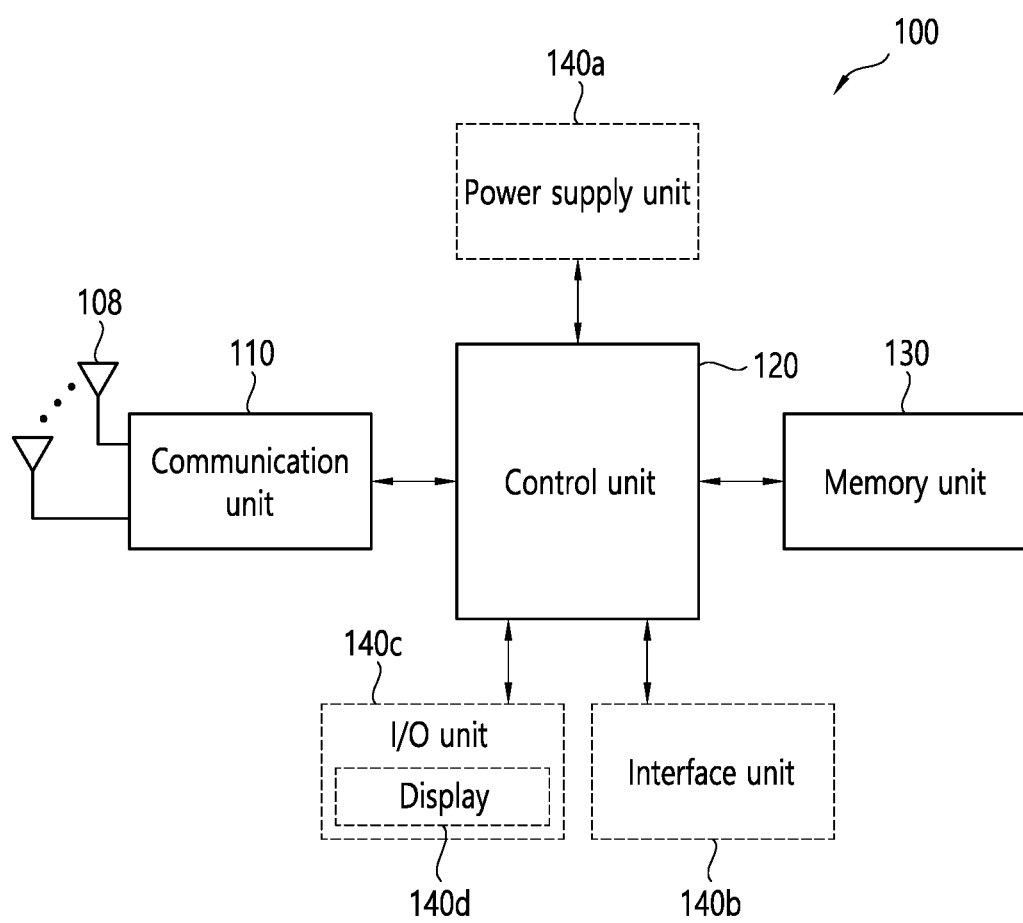
FIG. 33 shows a hand-held device to which the present specification is applied.

FIG. 33 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 33, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110~130/140 of FIG. 32, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 34:
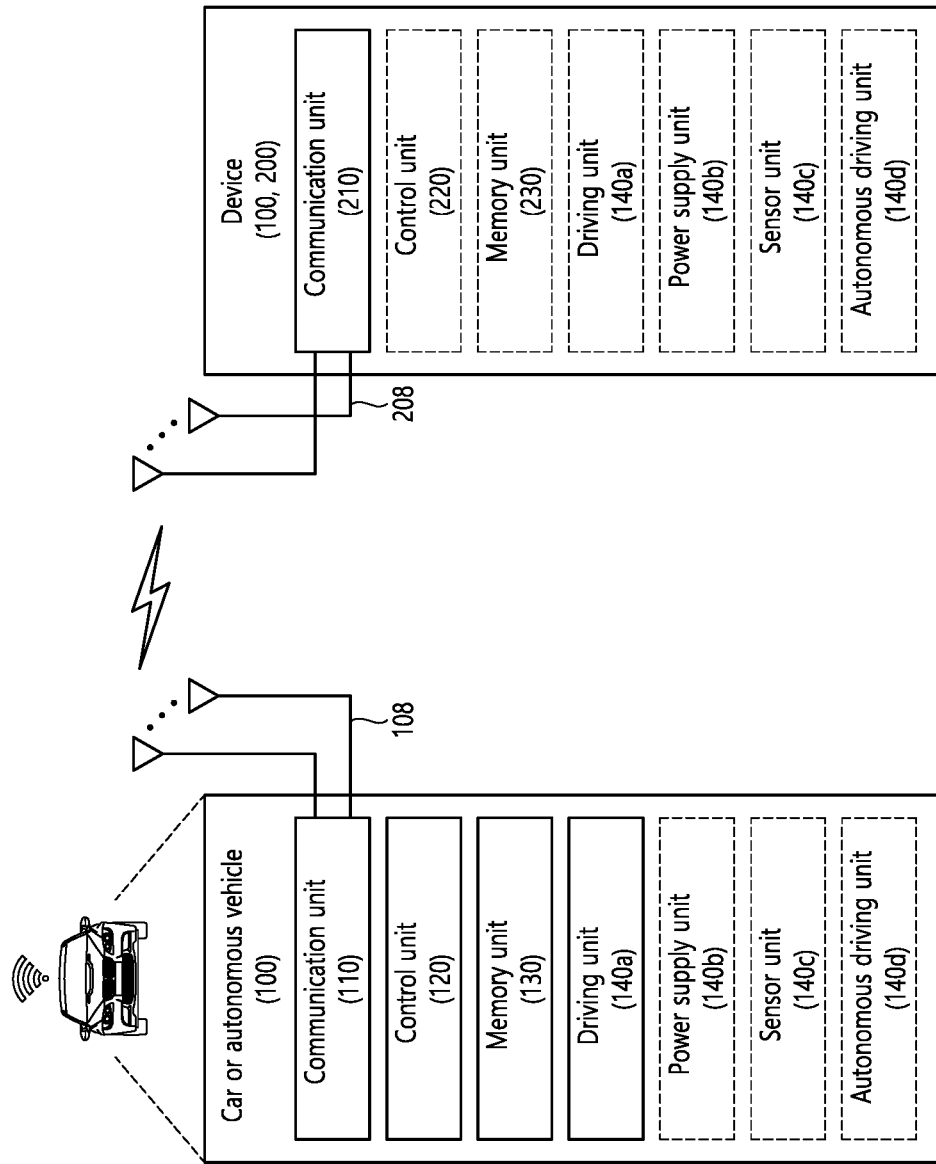
FIG. 34 shows a vehicle or an autonomous vehicle to which the present specification is applied.

FIG. 34 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 34, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 32, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140*d*) may generate an autonomous driving path and a driving plan from the obtained data. The control unit (120) may control the driving unit (140*a*) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method for monitoring a physical downlink control channel (PDCCH) in a wireless communication system, the method performed by a user equipment (UE) and comprising:
    receiving an operation indication signal informing one of a first operation and a second operation to be applied when the UE receives go to sleep signal (GTS);
    starting a discontinuous reception (DRX) inactivity timer; and
    monitoring the PDCCH while the DRX inactivity timer is running,
    wherein based on receiving the GTS while the DRX inactivity timer is running:
    i) based on the operation indication signal informing the first operation, the UE continues to operate the DRX inactivity timer, starts a GTS timer, and performs a sleep operation during running of the GTS timer, and
    ii) based on the operation indication signal informing the second operation, the UE stops the DRX inactivity timer, starts a GTS timer, and performs a monitoring of a wake-up signal (WUS) during running of the GTS timer.

2. The method of claim 1, wherein the UE transitions to a sleep state based on failure to receive the PDCCH while a DRX on duration timer is running.

3. The method of claim 1, wherein the UE restarts the DRX inactivity timer based on receiving the PDCCH while a DRX on duration timer is running, and
    wherein the UE monitors another PDCCH while the DRX inactivity timer is running.

4. The method of claim 1, wherein a duration of a DRX on duration timer is shorter than a duration of the DRX inactivity timer.

5. The method of claim 1, wherein the UE receives information on a value of the DRX inactivity timer from a base station.

6. The method of claim 1, wherein the DRX inactivity timer starts when the UE receives the PDCCH during an on-duration.

7. A user equipment (UE) comprising:
    at least one transceiver for transmitting and receiving radio signals; and
    at least one processor that operates in conjunction with the at least one transceiver, wherein the at least one processor is adapted to:
    receive an operation indication signal informing one of a first operation and a second operation to be applied when the UE receives go to sleep signal (GTS);
    start a discontinuous reception (DRX) inactivity timer; and
    monitor a physical downlink control channel (PDCCH) while the DRX inactivity timer is running,
    wherein based on receiving the GTS while the DRX inactivity timer is running:
    i) based on the operation indication signal informing the first operation, the UE continues to operate the DRX inactivity timer, starts a GTS timer, and performs a sleep operation during running of the GTS timer, and
    ii) based on the operation indication signal informing the second operation, the UE stops the DRX inactivity timer, starts a GTS timer, and performs a monitoring of a wake-up signal (WUS) during running of the GTS timer.

8. The UE of claim 7, the UE communicates with at least one of a mobile terminal, a network, and an autonomous vehicle other than the UE.

* * * * *